(12) United States Patent
Korman et al.

(10) Patent No.: US 8,448,410 B2
(45) Date of Patent: May 28, 2013

(54) BUILDING BLOCK, BUILDING BLOCK MOLD, AND METHOD FOR FORMING BUILDING BLOCK

(75) Inventors: Benjamin Zvi Korman, Cayucos, CA (US); John Anthony Ruskey, III, Goleta, CA (US); John A. Ruskey, Goleta, CA (US)

(73) Assignee: Oryzatech, Inc., Goleta, CA (US)

( * ) Notice: Subject to any disclaimer, the term of this patent is extended or adjusted under 35 U.S.C. 154(b) by 1219 days.

(21) Appl. No.: 12/234,485

(22) Filed: Sep. 19, 2008

(65) Prior Publication Data

US 2009/0077920 A1    Mar. 26, 2009

Related U.S. Application Data

(60) Provisional application No. 60/974,243, filed on Sep. 21, 2007.

(51) Int. Cl.
*E04B 1/00* (2006.01)

(52) U.S. Cl.
USPC ................ 52/750; 52/606; 52/DIG. 9

(58) Field of Classification Search
USPC ............. 52/596, 606, DIG. 9, 79.1, 79.2, 52/561, 569, 729.1, 289, 600, 604, 605, 607, 52/612, 750
See application file for complete search history.

(56) References Cited

U.S. PATENT DOCUMENTS

| | | | |
|---|---|---|---|
| 1,604,097 A | 10/1926 | James | |
| 1,633,702 A | 6/1927 | Hewlett et al. | |
| 3,846,265 A | 11/1974 | Yamaguchi et al. | |
| 4,058,580 A | 11/1977 | Flanders | |
| 4,154,030 A | 5/1979 | Huguet | |
| 4,225,359 A | 9/1980 | Schneider | |
| 4,248,343 A | 2/1981 | Schaefer | |
| 4,433,521 A | 2/1984 | Dietrich | |
| 4,473,390 A | 9/1984 | Teufel | |
| 4,587,279 A * | 5/1986 | Salyer et al. | 523/206 |
| 4,999,945 A | 3/1991 | Calub | |
| 5,432,213 A | 7/1995 | Kim et al. | |
| 5,507,127 A | 4/1996 | Gates | |
| 5,519,985 A | 5/1996 | Dyck et al. | |
| 5,656,129 A | 8/1997 | Good et al. | |
| 5,729,936 A | 3/1998 | Maxwell | |
| 5,749,199 A | 5/1998 | Allen | |

(Continued)

FOREIGN PATENT DOCUMENTS

| | | |
|---|---|---|
| CN | 2687230 Y | 3/2005 |
| CN | 1843716 A | 10/2006 |

(Continued)

OTHER PUBLICATIONS

International Preliminary Report on Patentability, PCT/US2008/077117 dated Apr. 1, 2010.

(Continued)

*Primary Examiner* — William Gilbert
(74) *Attorney, Agent, or Firm* — The Dobrusin Law Firm, P.C.

(57) ABSTRACT

The present invention provides an improved building block formed of recycled straw stalks, a mold for forming the block, and a method of forming the block. The improved block provides a moisture and pest resistant building block having high dimensional tolerances and being capable of long term use without structural degradation.

19 Claims, 9 Drawing Sheets

U.S. PATENT DOCUMENTS

| | | | |
|---|---|---|---|
| 5,749,954 | A | 5/1998 | Law et al. |
| 5,893,309 | A | 4/1999 | Ast |
| 5,932,038 | A | 8/1999 | Bach et al. |
| 5,937,588 | A | 8/1999 | Gard |
| 6,041,566 | A | 3/2000 | Allen |
| 6,061,986 | A | 5/2000 | Canada |
| 6,272,805 | B1 | 8/2001 | Ritter et al. |
| 6,948,282 | B2 | 9/2005 | Bott |
| 6,951,080 | B2 | 10/2005 | Korman |
| 7,707,784 | B2 | 5/2010 | Korman et al. |
| 2003/0208982 | A1 | 11/2003 | Korman et al. |
| 2004/0134154 | A1 | 7/2004 | Bott |
| 2005/0178081 | A1* | 8/2005 | Bott .............................. 52/596 |
| 2005/0223671 | A1* | 10/2005 | Korman et al. ................ 52/607 |
| 2006/0037271 | A1* | 2/2006 | Sinclair, Sr. ................... 52/596 |
| 2009/0019813 | A1 | 1/2009 | Kormen et al. |

FOREIGN PATENT DOCUMENTS

| | | |
|---|---|---|
| KR | 20-1998-056729 U | 10/1998 |
| KR | 10-1999-0035720 A | 5/1999 |
| SE | 9603040-8 | 10/1997 |

OTHER PUBLICATIONS

U.S. Appl. No. 12/724,752, filed Mar. 16, 2010.
International Search Report and the Written Opinion of the International Searching Authority for PCT/US2008/077117.
PCT Application No. US08/77117 filed Sep. 19, 2008.
Platts, Bob, P.E., "A Threat to Strawbale Housing," The Last Straw, Issue #22 (1998), available at http://www.strawhomes.com/backissues/articles/22_07.html—Last Accessed on Mar. 11, 2002.
"House of Straw, Straw Bale Construction Comes of Age," U.S. Dept. of Energy, Energy Efficiency and Renewable Energy (1995), available at: http://www.eren.doe.gov/buildings/documents/strawable.html.—Last Accessed on Mar. 11, 2002.
"R-Value of Straw Bales Lower Than Previously Reported," Environmental Buildings News, vol. 7, No. 9 (1998), available at: http://www.building green.com/news/r-value.html—Last Accessed on Mar. 11, 2002.
Lassuy, Elixabeth, "Straw-Bale Dome Report," The Art of Natural Building Design, Construction, Technology, available at: http://www.networkearth.org/naturalbuilding/sbdome.html—Last Accessed on Mar. 13, 2002.
Straw: The Next Great Building Material?, Environmental Building News, vol. 4 No. 3 (1995), available at: http://www.buildinggreen.com/features/straw/straw.html—Last Accessed on Mar. 11, 2002.
"Wise Guys Write Book: Build it with Bales, Version Two," The Last Straw, Issue#19 (1997), available at: http://www.strawhomes.com/backissues/articles/19_03.html.—Last Accessed on Mar. 11, 2002.
Office Action dated Sep. 27, 2010 in copending U.S. Appl. No. 12/724,752.
Chinese Application Number: 200880107330.3, Office Action dated May 26, 2011.

* cited by examiner

BUILDING BLOCK, BUILDING BLOCK MOLD, AND METHOD FOR FORMING BUILDING BLOCK

CLAIM OF BENEFIT OF FILING DATE

The present application claims the benefit of the filing date of U.S. Provisional patent application Ser. No. 60/974,243, filed on Sep. 21, 2007, the contents of which are hereby incorporated by reference in their entirety.

FIELD OF THE INVENTION

The field of the present invention is directed generally to building materials and more particularly to "green" building blocks made from culm such as residual rice straw.

BACKGROUND OF THE INVENTION

In recent years there has been a resurgence in the search for environmentally sensitive construction materials, or what are referred to widely as "green" construction materials. This has caused the field to re-visit and improve upon some established technologies, such as straw bale construction materials. Though offering certain advantages, especially in view of the abundance of available materials and relatively low baling costs, straw bales tend to be limited in application due to some of their disadvantages. For example, conventional straw bales tend to have poor quality external surfaces (e.g., they are typically unkempt in appearance, with stray fibers protruding from them), they tend to be limited in their insulation capabilities; they tend to be limited in the attainable geometries and/or sizes, or any combination thereof. Accordingly, there is an ongoing need to identify and develop alternative "green" construction materials other than conventional straw bales.

Another issue the building industry has encountered is the lack of a standardized straw bale for construction. This can be particularly problematic when a large quantity of uniform blocks are required, such as when attempting to design and build medium to large sized structures or when designing a plurality of buildings such as in a residential subdivision or otherwise. This is due, in part, to the lack of availability of suppliers offering straw bales having, at a minimum, a common size and weight. As such, contractors have typically been required to adjust their building practices based upon the fluctuating size and quality of the bales produced by a particular farmer's equipment and baling practices.

While the industry could help toward improving this problem, with stringent certifications or standards, such regulation is believed difficult to implement, largely because of the vast range of available processing techniques and variables as to taking straw bales directly from the fields when the contract balers bundle the straw and bind everything with wire, as well as the great fluctuations in the raw material characteristics, and the resulting unpredictability from the combination of the foregoing. What is needed is an alternative technology that lends itself to a common platform that can be employed with consistency and reproducibility.

The agricultural industry is faced with annually disposing of tons of agricultural by-products, such as waste straw, particularly rice straw originating from the oryza sativa plant. For instance, after harvest of the grains of rice, the remaining rice straw stalks remain in the planting areas and require disposal. One method of disposal is to burn the straw. However, burning of this plant, to make room for the following season's crop, is impractical, harmful to the environment and may be unlawful. Additionally, rice straw stalks lack substantive nutritional values, providing little value as a fertilizer or other foodstuff. Further, in some instances, it is possible that the stalks may contain diseases or insects, which especially in combination with its slow decay rate make it impractical to plow the remaining stalk back into the soil.

As an alternative to seeking to dispose of waste agricultural by-products (e.g., straw), attention has been given to efforts at re-cycling or finding uses for the agricultural by-products. Applying such waste materials in the formation of construction materials has been the subject of commonly owned U.S. Pat. No. 6,951,080, and co-pending U.S. patent application Ser. No. 10/807,946 (filed Mar. 24, 2004, U.S. Publication No. 2005/0223671) and Ser. No. 12/187,779 (filed Aug. 13, 2008); the contents of which are hereby expressly entirely incorporated by reference for all purposes.

Other efforts to address uses of waste agricultural by-products are illustrated, without limitation, in U.S. Pat. No. 7,073,306 to Hagaman, entitled Method of Building purports to show a method of building a wall assembly with fibrous material such as straw. U.S. Pat. No. 5,656,129, entitled Method of Producing Fibers From a Straw and Board Products Made There from addresses a method of refining wheat straw into fibers by cutting the straw to a length of between about two and about four inches, wetting the straw, softening the straw by subjecting the straw to pressurized steam and refining the softened straw in a pressurized mechanical refiner to produce fibers capable of being used in the manufacture of cellulosic board products. U.S. Pat. No. 4,058,580 to Flanders addresses a reinforced board manufacturing process whereby a compressed uniform mixture of comminuted lignocelluloses particles, binder and other additives that have a plurality of elongate reinforcing filaments having substantially greater tensile strength and modulus of elasticity than the mixture, embedded therein and bound to the particles by the binder.

Accordingly, not only would it be attractive to provide a construction material effectively comprising agricultural by-products (e.g. recycled straw stalks) that have little other practical use, but it would be especially desirable to provide such a construction material so that it will yield consistent and uniform characteristics, function as a support structure in a building, further provide for multifunctional use, (such as a mounting surface), a surface subject to coating, or both, or any combination thereof.

SUMMARY OF THE INVENTION

The present invention meets some or all of the above-mentioned needs by providing an improved building block formed of agricultural by-products, and more particularly recycled waste agricultural by-products (e.g., straw stalks), and methods and devices (e.g., molds) for forming the building block, and a method of forming the building block. The improved block provides a moisture, fire and/or pest resistant building block having attractive surface finish, high dimensional tolerance capability, good resistance to degradation, and/or compressive strength. The improved block also lends itself well to use in the fabrication of buildings, especially as parts of walls for buildings.

One aspect of the invention is directed towards a building block comprising a plurality of opposing spaced apart outer walls, each having an outer wall portion exhibiting a first density, that surround an interior portion having a second density that is less than the first density, wherein the building block includes a plurality of stalks of agricultural by-products that are bonded together with an added binder in addition to any naturally occurring binder of the stalks, wherein the ratio by weight of the stalks to the added binder is greater than about 10:1, and wherein a progressively varying density gradient (e.g. a continuous density gradient) exists from the outer wall portion toward the interior portion.

This aspect of the invention may be further characterized by one or any combination of the following: the building block further compromises stalks consisting essentially of rice stalks; the added binder includes an isocyanate, a reaction product involving a reaction with an isocyanate, or both; the difference in density between the first density and the second density is at least about 10%, and all of the outer walls have substantially the same density; the block includes a top wall, a bottom wall spaced from the top wall, a pair of opposing spaced apart side walls, a front wall and a rear wall spaced apart from the front wall, and an opening that extends between the top wall and the bottom wall providing a passage between such walls; the opening that extends between the top wall and the bottom wall is generally tapered; the opening that extends between the top wall and the bottom wall is generally hour glass shaped; one of the top wall or the bottom wall includes a structure that generally surrounds the opening and projects outwardly away from such wall, and the other of the top wall or bottom wall includes a recessed structure that generally surrounds the opening and projects inwardly from such wall, so that when a block is assembled with an adjoining block the projecting structure matingly engages the recessed structure; at least one of the walls includes a rib projection that extends across the wall, and another of the walls includes a channel that extends across the wall, so that when a block is assembled with an adjoining block the rib matingly engages the channel; at least one of the walls includes an additional opening; a method may be employed of making such a building block comprising the steps of filling a mold with the stalks, applying a pressure of less than about 2000 psi (e.g. below about 1250 psi) to the stalks while in the mold, heating the stalks to a temperature of about 300° F. for a period of about 30 minutes while the pressure is being applied. A method may be employed of making a building block that uses a mold that is configured to include two opposing main walls, two opposing side walls, a first wall generally orthogonal to the main and side walls, a second wall opposite the first wall and generally orthogonal to the main and side walls, at least one of the walls is moveable with respect to the other of said walls, further wherein the mold includes a locking feature for limiting movement of the wall that is moveable, the mold further includes one or more projections extending from one or more walls.

Another aspect of the invention is directed at a method of forming a building block, the method comprising providing a plurality of straw stalks, adding a binder to the plurality of straw stalks, placing the straw stalks in a mold, wherein the mold includes at least one moveable wall adapted to compress the plurality of straw stalks, compressing the straw stalks through the at least one moveable wall at a pressure of less than about 2000 psi, heating the straw stalks to a temperature of about 300° F. for a period of about 30 minutes.

This aspect of the invention may be further characterized by one or any combination of the following: the method uses a mold that is configured to include two opposing main walls, two opposing side walls, a first wall generally orthogonal to the main and side walls, a second wall opposite the first wall and generally orthogonal to the main and side walls, at least one of the walls is moveable with respect to the other of said walls, further wherein the mold includes a locking feature for limiting movement of the wall that is moveable, the mold further includes one or more projections extending from one or more walls; the binder includes an isocyanate, a reaction product involving a reaction with an isocyanate, or both; a step of chopping the plurality of straw stalks is used; randomly orientating the plurality of straw stalks; aligning the plurality of straw stalks; machining the block forming one or more openings through the block, rounding or chamfering one or more edges of the block, forming at least a portion of an engagement feature for engagement with a corresponding feature of another block, or any combination thereof; or wherein the plurality of straw stalks generally include straw stalks having a length of up to about 16 inches.

Another aspect of the invention is the use of a building block of any of the above in the manufacture of a wall assembly of a building; or use of a building block of any of the above in a wall assembly in which the blocks are connected via a common bracket that includes a pair of spaced apart rails connected by at least one cross bar, and wherein the blocks are attached to the rails.

It should be appreciated that the above referenced aspects and examples are non-limiting as others exist with the present invention, as shown and described herein. For example, any of the above mentioned aspects or features of the invention may be combined to form other unique configurations of the finished block, as described herein, demonstrated in the drawings, or otherwise.

Figure 1:
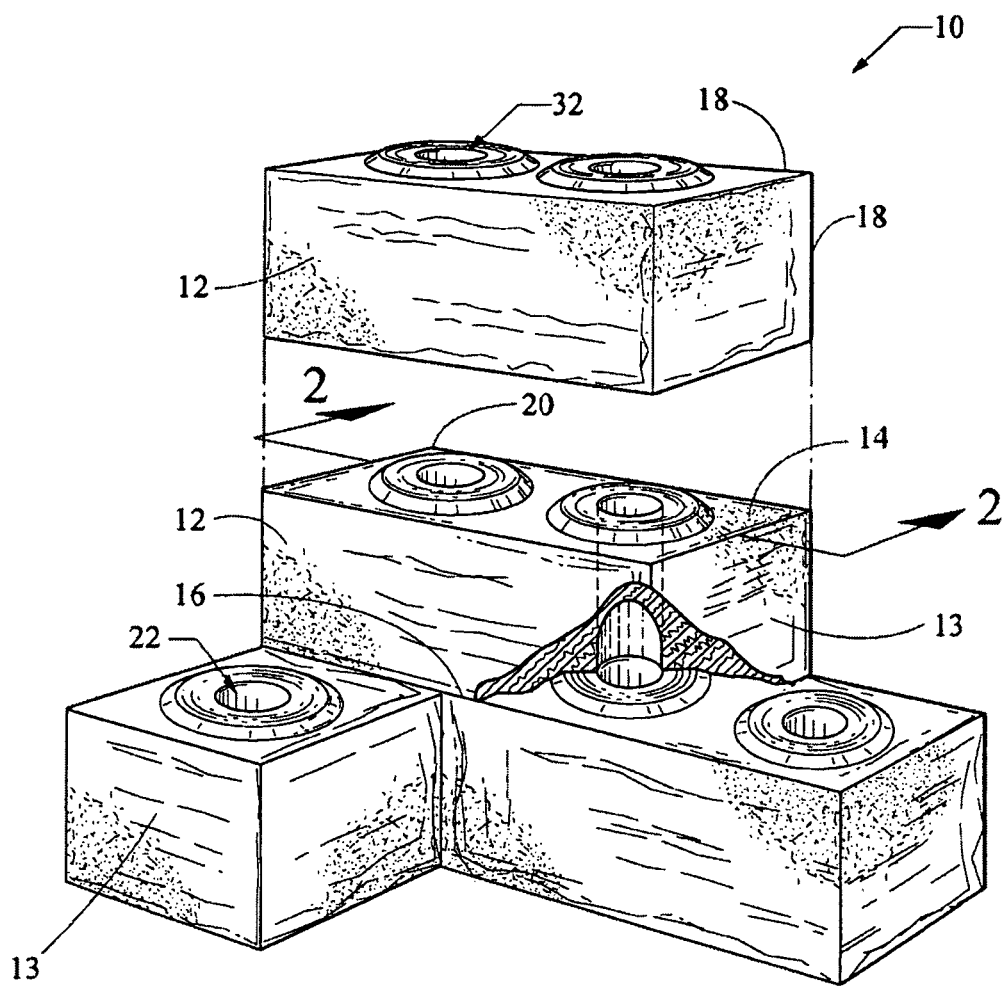
FIG. 1 illustrates an embodiment of a building block being stacked with other building blocks to form a block assembly (e.g., a block wall assembly).
Figure 1B:
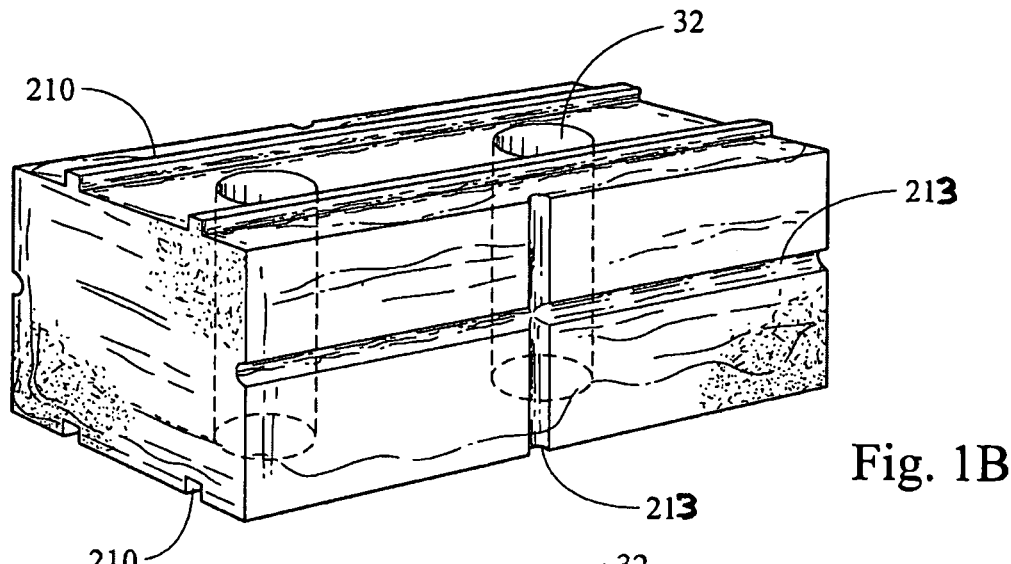
FIGS. 1B-D illustrates embodiments of building blocks, each with features that may be interchanged with and/or combined with features of any of the embodiments.

It will be appreciated that the features of any one of the blocks illustrated in the drawings may be interchanged with and/or combined with features of any of the other blocks.

DETAILED DESCRIPTION

The present invention seeks to improve on the teachings of commonly owned U.S. Pat. No. 6,951,080, and co-pending U.S. patent application Ser. No. 10/807,946 (filed Mar. 24, 2004, U.S. Publication No. 2005/0223671) and Ser. No. 12/187,779 (filed Aug. 13, 2008); the contents of which are hereby expressly entirely incorporated by reference for all purposes. Through the improvements, as described herein, the present invention provides an improved block, devices and methods of forming the same, which provide a building block having one or any combination of improved strength, greater resiliency and durability, increased stackability and overall greater versatility as compared with existing blocks. As mentioned, the improved block leads itself to providing a moisture, fire and/or pest resistant building block having attractive surface finish, high dimensional tolerance capability, good resistance to degradation, and/or compressive strength. The improved block also lends itself well to use in the fabrication of buildings, especially as parts of walls for buildings.

In general, the blocks herein will employ compressed agricultural by-products, (and more preferably straw stalks, at least a portion of which preferably are bound together with a binder, and more preferably with an added binder. The blocks may include a plurality of adjoining outer walls, each with an exterior surface (e.g., six or more adjoining outer walls, such as generally orthogonally oriented outer walls). The outer walls will typically surround an interior portion that is concealed from view within the walls. The density of the blocks will typically vary progressing inwardly from the exterior surfaces toward the interior for realizing one or more density gradients (e.g., a density gradient (when density is plotted on a y-axis against distance from wall on an x-axis) that is generally continuous, free of sudden vertically steep decrease (e.g., a sudden decrease in density of such magnitude such as a density drop more than about 10% over a distance of less than about 5 mm) such that the plot would be substantially perpendicular to the x-axis). For example, all of the outer walls may have substantially the same density at or within about 1 cm of its outer surface, but will have a density within the interior portion (e.g., at a distance of at least about 5 cm, or even 10 cm from the outer wall surface) that is at least about 5% lower, more preferably at least about 10% lower, and still more preferably at least about 20% or lower than that of the outer surface. Further, it is possible that the interior portion may be free of any binder, or it may include added binder, at least 50% of which is substantially uncured added binder, or at least 50% of which does not bind adjoining stalks.

One approach herein is to define a wall structure that includes interior disposed walls that connect with one or more exterior disposed walls. Preferably, due to their density, the walls are relatively rigid (particularly as compared with the rigidity of the interior portion), and thus may be relatively hard, relatively strong in compression or each, as compared with a lower density region. For example, openings may connect opposing outer walls. The openings may be (i) of substantially constant cross-sectional size, geometry or both; (ii) of continuously varying cross-sectional size, geometry or both; or a combination of (i) and (ii). The openings effectively can define a tunnel through the block. One possible approach is to employ an opening that has a profile that varies continuously or intermittently along its length, by starting with a larger opening at one end, constricting the opening size toward an intermediate location, and then enlarging again toward an opposing end. For example, the opening may have a generally optionally hour-glass configuration. In another example, the opening may have a general taper where the cross-sectional size gradual decreases from one end to the other. A tapered hole, such as a hole with an hour-glass configuration, will add added support and strength to a wall built from building blocks with such holes when the holes are filled with a substance such as concrete. The concrete will add both lateral and vertical support to the wall. The edges where the opening intersects with an outerwall may be rounded, sloped, or both.

Among the many benefits attainable by the blocks of the present invention are one or any combination of the following features: the improved block of the present invention includes a plurality of rigid walls forming a generally smooth, and/or flat outer surface (especially when compared with conventional straw bales); the block walls may be suitable for providing strength to the block, particularly during stacking; the walls of the blocks may receive and hold fasteners for attachment of various items to the block, such as weather proof sheeting, drywall, panels, insulation, or otherwise; the block walls may support or carry a mechanical device or other feature that allows stacking and/or aligning of the block in an arrangement that allows for flush placement of respective adjoining walls of the blocks, for helping to achieve a generally smooth overall topography for a wall assembly constructed from the blocks (e.g., the flush arrangement may make it possible to eliminate or minimize any appreciable gap located between the blocks in forming the walls, and thus provide a overall wall assembly that is free of mortar, grout or other filler material); the building block may be free of any encircling band or sleeve (e.g. free of any lath); the walls of blocks may have a non-planar topography and the thickness of the higher density wall sections of the walls is at least about 10% (or even at least about 15%) of the width, length, height, or a combination thereof, of the block; the overall density of the building block may be at least 5% greater than (e.g., at least 10% greater than, or even at least 15% greater than) a block having the same amount of agricultural by product (e.g. straw) but has no added binder, has not been compacted in the presence of an elevated temperature for activating a binder, or both; or the outer wall surfaces of a block are at least 10% less porous (e.g., at least 15% less porous than, or even at least 25% less porous) than corresponding outer wall surfaces of a block having the same amount of straw but has no added binder, has not been compacted in the presence of an elevated temperature for activating a binder, or both.

It is also possible that the block of the present invention possesses highly desired insulation properties. In one configuration, a building block with a 12 inch width may exhibit R-values ($ft^2 \cdot °F \cdot h/Btu$) in the range of about at least 10 R, 10 to 30 R, 15 to 24 R, or otherwise. In SI units, a building block with a 30.5 mm width may exhibit R-values ($K \cdot m^2/W$) in the range of about at least about 1.7 R, e.g. about 1.7 to 5.3 R, or more preferably at least about 2.5 (e.g. about 2.5 to 4.3 R).

It is also possible that the block of the present invention possesses highly desired fire resistant properties and is generally substantially more fire resistant than a traditional straw bale. For example, the block may contain high silica content naturally occurring in the straw which may retard fire growth by charring, thereby insulating inner straw. The block density may range from 6 to 20 lb/cubic ft, 10 to 16 lb/cubic ft, 12 to 14 lb/cubic ft, or otherwise.

It is possible that in construction of building assemblies that blocks may have cracks therein, and/or there may be cracks between adjoining blocks. One preferred approach is to fill those cracks with a sealing material or a filler. For example, a straw-clay mix may be used to seal cracks in the building block inhibiting flame propagation as cracks in the building block tend to enable flame propagation. Further by filing the holes within the building block with a material such as concrete for example will also have the tendency to inhibit flame propagation with the block by reducing air flow.

The individual blocks of the present invention typically will exhibit a compressive yield strength (e.g., per ASTM C-109; results within up to about 10% of the values recited are also believed possible within the methods of ASTM E72) in the range of about 11 to 45 psi, 16 to 35 psi, 19 to 28 psi, or otherwise. The building blocks may also exhibit a safety factor under load (per ASTM) in the range of about 3 to 14, 5 to 10, or otherwise. The building may also further exhibit a deflection in the range of about 0.175 to 7 in, 0.266 to 0.425 in, or otherwise.

In one configuration, the blocks are able to withstand at least 3 psi in compression without failure, and more preferably at least about 5 psi (e.g., about 5.6 psi). Wall assemblies made from connecting a plurality of blocks may withstand (per California Health and Safety Codes) at least 600 lbs per linear foot with less than about 0.5 inches vertical deflection, and more preferably at least about 800 lbs per linear foot with less than about 0.25 inches vertical deflection; it withstands laterally applied holds exceeding at least about 300 lbs per linear foot with less than 2.5 inches of out of plane deflection and more preferably at least about 360 pounds per linear foot with less than about 2 inches of out of plane deflection. Blocks herein, when stacked, form a wall assembly that resists shear, bending and/or buckling.

For example, the blocks herein, and walls incorporating the same preferably will comply with the "straw bale code" for California. See, e.g., California Health and Safety Code No. 18944, incorporated by reference herein. Accordingly, preferably they will meet some or all of the following requirements: The blocks shall be of consistent height and width to ensure even distribution of loads within a wall assembly; blocks will have at least as high a fire resistive rating as wood-frame construction with the same wall-finishing system; the moisture content of blocks, at the time of installation, shall not exceed 20 percent of the total weight of the block; earthen and/or lime-based plasters may be applied directly onto block walls without reinforcement; blocks plastered with cement or lime cement plaster on both sides shall be capable of resisting in-plane lateral forces from wind or earthquake of at least about 300 pounds per linear foot, and more preferably at least about 360 pounds per linear foot; blocks plastered with cement or lime cement plaster on both sides shall be withstand a load of at least 600 pounds per linear foot and more preferably at least about 700 pounds per linear foot (e.g., at least about 800 pounds per linear foot).

It is believed that blocks in accordance with the present invention (e.g., blocks having the structures described herein and/or made by the processes described herein) will compare favorably with existing construction materials used for similar purposes. For example, as compared with conventional straw bales, it is believed that blocks of similar weight herein exhibit an improvement in values for compressive strength of at least about 5%, more preferably at least about 10%, and still more preferably at least about 15% (e.g., at least about 20%) when subjected to identical test methods. As compared with conventional insulated building vertical wall structures (2×4 insulated walls), and/or standard concrete block construction, it is believed that blocks herein exhibit an increase in insulation (R value) of at least about 10%, more preferably at least about 20%, and still more preferably at least about 30% (e.g., at least about 40%) when subjected to identical test methods. See, e.g., J. McCabe, University of Arizona Master of Architecture Thesis (1993) (incorporated by reference) (employing ASTM C-177-85); Acton (Sandia National Laboratories), both incorporated by reference. Further, it is believed that, as compared with reported values for R-values for conventional straw bales (see, e.g., J. McCabe, University of Arizona Master of Architecture Thesis (1993) (incorporated by reference) (employing ASTM C-177-85); Acton (Sandia National Laboratories), the blocks herein will be within at least about 50% of the value, and more preferably within at least about 70% of the value. It is believed that blocks herein would pass the fire resistance test (for at least one hour) of ASTM E-119. It is believed that a wall assembly using blocks described herein would pass the transverse load test of ASTM E-330.

It is believed that the use of the building blocks of the present invention compared to the use of standard building materials in the construction industry may result in an overall energy savings along with reduced emissions of carbon dioxide into the environment.

Generally speaking, due to carbon dioxide sequestration during the life of the plant and emissions avoided by not burning the plant, a straw building block can substantial reduce carbon dioxide emissions when compared to brick. For example, The premanufacture, manufacture, and transportation of a straw building block may have a net environmental effect of removing about 0.9 to 1.9 tons of carbon dioxide/house estimated from the environment (again, this reduction is due in part to carbon dioxide sequestration and carbon dioxide emission avoidance by not burning the plant). When compared to the carbon dioxide emissions from the premanufacture, manufacture, and transportation of bricks for a similar brick home, about 3.5 to 4.5 tons of carbon dioxide may be produced. Construction using straw building blocks may be more environmental friendly then building with bricks.

Moreover, due in part, to increased insulating properties of straw building blocks compared to bricks, total carbon dioxide emissions attributed to heating and cooling a house are reduced through the use of straw building blocks by at least about 20%, more preferably at least about 30%, and still more preferably at least about 50% (e.g., at least about 60%) when subjected to identical test methods.

It is also possible that the blocks of the invention are free of failure or defects due to splitting (fine, coarse, or both); local buckling (fine, coarse or both, or due to stalk orientation); fraying; and/or shearing (fine shearing, end shearing or coarse shearing).

Another aspect of the present invention that will be appreciated from the teachings herein is the use of the blocks herein to form building structures, such as wall assembly structures that include a plurality of adjoining blocks. The adjoining blocks may be connected together with suitable engagement features, which may provide one or both of the functions of providing further strength and/or resistance for buckling to any wall assembly formed of the block, or alignment of the blocks during stacking. The alignment feature of the block may be integrally formed as part of an individual block to form a unitary block structure. Optionally, the engagement feature may be formed with other alignments or strengthening features such as through holes used for placement of supporting members (e.g. concrete, reinforcement bars or otherwise).

Another feature of the present invention is the process and/or devices that may be used to form the building blocks. In particular, as will be illustrated, the blocks of the invention may be shaped and compressed within a mold. After loading agricultural by-products within the mold, the mold may be configured (e.g., the mold may be gusseted and/or ribbed to help strengthen the walls of the mold) in such a manner that it retains the form and pressure applied to the building block while the building block is heated. After heating, the building block can be released from the mold.

Yet another feature of the present invention is realized by improved methods of forming the building blocks. The methods contemplate both low production of the building blocks through one or more forming machines and high production through a mass production configuration. The method is particularly suited for forming blocks which may be partially or completely rigid throughout the block. Due to the nature of the blocks and the tools needed to form them it is possible that one or all of the steps of the methods herein may be preformed locally at a construction site, locally at a site where the waste products are generated and/or the harvest site (e.g., proximate to a rice field), at a remote site from the harvest site (e.g. at a factory, or at the building site).

It should be appreciated that the above general discussion is but only a few of the features and advantageous of the present invention as others exist as shown and described herein.

The blocks of the present invention are preferably formed of agricultural by-products, and preferably straw stalks, such as discussed in commonly owned U.S. Publication No. 2005/0223671, (see, e.g., paragraph 0023, incorporated by reference). Preferably, substantially the entire block is formed of straw stalks. Furthermore, it is contemplated that the block may include one or more features that are integrally incorporated and formed with the block to form a unitary structure. Such features include alignment features or otherwise as described herein.

The straw stalks, or other agricultural by-products, may be arranged and/or bound together in different configurations. For example, the straw stalks may be generally or substantially aligned with respect to one another, such as is taught in U.S. Pat. No. 6,951,080, incorporated by reference. Alternatively, the straw stalks may be randomly aligned and free of clusters of axially aligned stalks. If the straw stalks become aligned through some preparation process, harvesting process, or otherwise, then they may be made to be random.

When straw stalk is used, the length of the straw stalks may be generally consistent or have different lengths. For example, the average lengths of the stalks may be greater than about 3 cm, 6 cm, 9 cm or even 12 cm. The average lengths of the stalks may be less than about 40 cm, 30 cm, or even 20 cm. It is contemplated that the length of the stalks may be in the range of dust particle size (e.g., about 10 microns) up to about 40 cm. For at least 75% by weight of the straw used, the lengths will be about 3 to about 40 cm.

Straw stalks may optionally be cut before forming into a block. For example, the stalks may be unchopped, chopped, unshredded, shredded, or any combination thereof, prior to forming into a block. Stalks may be cut to one or a plurality of common lengths, they may be cut to random lengths, or a combination thereof.

The block may be formed of any suitable agricultural by-product and preferably it will include or consist essentially of organic straw material, such as straw described in commonly owned U.S. Publication No. 2005/0223671 incorporated by reference. Some specific examples of suitable straw include rice, wheat, barley, rye and other types of grasses and/or cereal crop. However, non-organic straw may also be used including synthetic fiber strands or otherwise. Accordingly, while hereafter 'straw stalks' are generally used it should be appreciated that any of the straw stalks described herein or otherwise may be used. Further, as appreciated from the teachings, though straw stalks are disclosed as a preferred agricultural by-product for use herein, other agricultural by-products may be employed, e.g., other elongated agricultural by-product waste materials. Stalks may be hollow, solid, or a combination of both.

Referring to FIG. 1, a stack of building blocks 10 of the present invention is shown as forming a part of a wall assembly. Each block may include six walls. For example, as shown there may be two main walls 12, two side walls 13, a top wall 14, and a bottom wall 16. The two main walls 12 may be generally parallel with each and the two side walls 13 may also be generally parallel with each other. The main walls 12 may be generally orthogonally connected to the side walls 13; the main and side walls may be generally vertically orientated when the block is properly placed upon a ground surface or otherwise (though other orientations may be employed within these teachings). The top and bottom walls may be adjacently located with respect to the main and side walls. Preferably, the top wall 14 and bottom wall 16 are generally parallel with each other. One or more of the walls forming the block may comprise a rigid wall, which preferably is generally smooth. For example, in contrast with conventional straw bales, it will not have stray stalks that project outward from any one or more (e.g., all) of the wall surfaces beyond about 5 cm, more preferably about 3 cm or most preferably beyond about 1 cm (e.g., any stray stalks extend no greater than about 5 mm from the outer wall surface). The main walls (e.g., the walls that will be exposed to view in the wall assembly) may also be substantially flat, and free of any bulges.

Figures 3A, 3B:
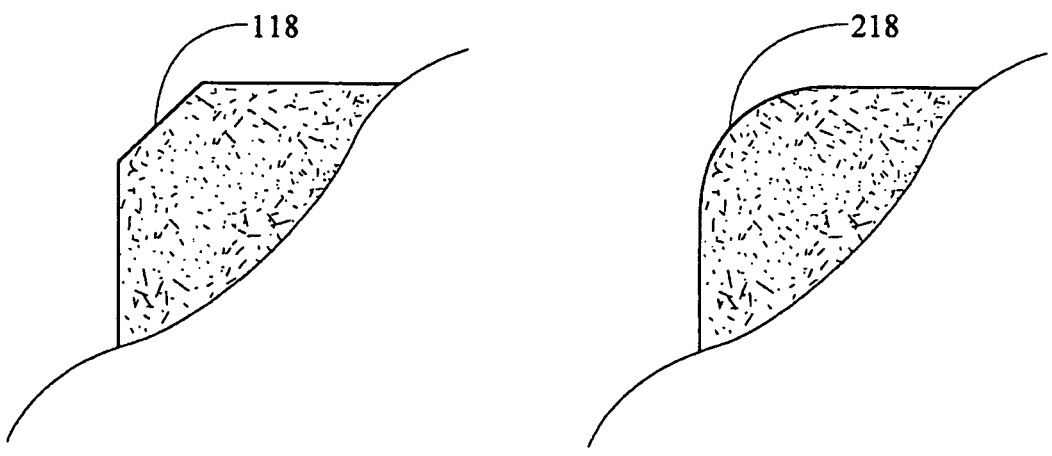
FIG. 3A illustrates an embodiment of a corner of a building block.
FIG. 3B illustrates another embodiment of a corner of a building block.

The configuration of the block forms a plurality of edges 18 and corners 20 about the block. The edges and corners formed by the joined walls may be generally crisp and sharp, as shown in FIG. 1. However, with the features of the present invention, the edges and corners may alternatively be rounded, chamfered or otherwise. This includes edges and corners that may be formed on a wood or other machineable board, panel or otherwise. For example, referring to FIGS. 3A and 3B, a chamfered 118 and rounded edge 218 is shown. It should be appreciated that some or all of the edges and corner of the block may be rounded, chamfered or otherwise. Other geometries are possible including geometries that include one or any combination of a flat surface, a sloped surface, an arcuate surface, an undercut, a cantilever or otherwise.

The size of the block may vary between applications. Preferably, the size of the block is one of standard building size and weight. Examples of suitable size include 12"×12"×24" (H×W×L, 30 cm×30 cm×61 cm). Another example includes 8"×12"×25" (20 cm×30 cm×64 cm). Blocks of half lengths are also desirable for placement in corners, such blocks can be formed as half blocks directly from a mold or a standard full block can be cut in half forming a half block. Other sizes are contemplated, such as but not limited to in the range of 6-14"× 10-14"×22-27" (15-36 cm, 25-36 cm, 56-69 cm). In one configuration, the block may have a width near or about equal to the width of a standard 2×12 (1½"×11¼" (width), 19 mm×286 mm (width)) piece of lumber. Examples of potential weights of the block include 25 lb (11 kg), 30 lb (14 kg), 40 lb (18 kg) or otherwise. In one configuration, the building block may be approximately 25 lbs (11 kg) to 35 lbs (16 kg), 28 lbs (13 kg) to 32 lbs (15 kg) in weight, or otherwise. The weight of the block may be based upon the density of straw stalks and size of the block. The block may includes a weight of about 0.008 lb per cubic inch (0.2 grams per cubic cm) to about 0.012 lb per cubic inch (0.3 grams per cubic cm) or otherwise. Preferably, the block includes a weight at or below a recommended amount for handling by a single person according to the Occupational Safety and Health Administration (OSHA). The ratio of volume between uncompressed to compressed straw used to form the building block may be in the range of approximately from 1.5-4.5 (uncompressed) to 1 (compressed), 2.5-3.5 (uncompressed) to 1 (compressed), or otherwise.

Optionally, the block may include one or more features for assisting in the stacking and/or securing of the blocks together. In one configuration, this feature may comprise an interlocking feature for assisting in securing blocks together. As previously mentioned, such features are preferably integrally formed with the block to form a unitary structure.

Accordingly, these features may be formed or defined by the straw stalks forming the block.

For example, referring to any of FIGS. 1, 1B, 1C, 1D, and 2, the block may include one or more alignment features such as 22, 32, and 210, for alignment of the blocks during stacking. In the configuration shown in FIG. 2, the alignment features 22 comprises a projection 24 (which is depicted as a generally annular projection) extending from the top or bottom wall and a recess 26 formed in the other of said top or bottom wall, the projection 24 and the recess 26 may function to mate with each other as an engagement feature between blocks. Optionally, they may be sized relative to each other to form a friction fit between blocks. In the example shown in FIG. 2, the projection is formed in the top wall 14 of the block and the recess is formed in the bottom wall 16 of the block. They may be present on side walls. In function, once the projection is inserted into recess, the projection and recess sidewalls 28, and 30 respectively, engage to both align and prevent lateral movement of the block. Further, the inclined nature of the projection and recess sidewalls thus can assist in the alignment of stacked block during assembly of a wall portion. The projection and recess sidewalls may be tapered relative to top or bottom walls in the range of about less than 90 degrees, less than 60 degrees, such as about 2 to 47 degrees, about 14 to 34 degrees, or otherwise. In one configuration, the alignment features 22 may be circular projections as shown in FIG. 1 with complimentary circular recesses. Circular attachment features assist in aligning a group of building blocks to form curved walls, the circular attachment features can also assist in realignment of building blocks forming a wall.

Figure 1C:
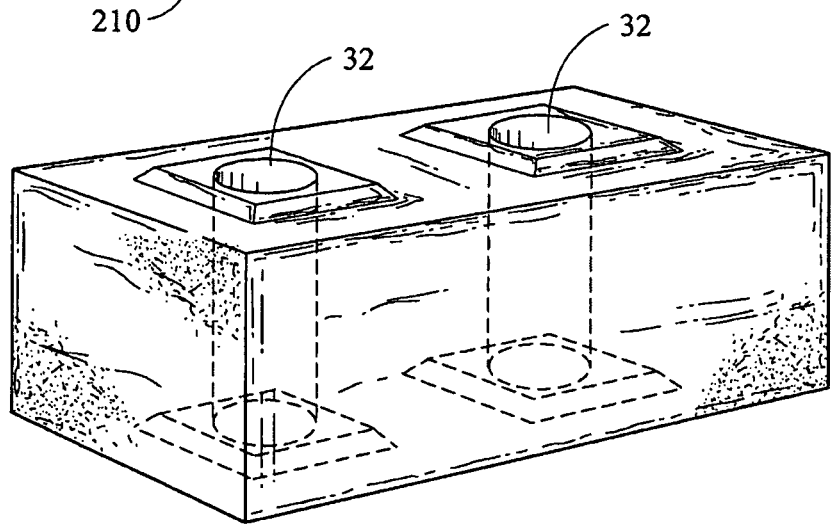

The alignment feature may be suitably sized based upon the size of the block. In one configuration, the engagement features includes a diameter of about 8 inches (20 cm). Further, the recess and projection may extend about 0.75 inches (1.9 cm) with respect to the surface of the wall in which it are formed. In one configuration, referring to FIG. 1, the alignment/engagement feature may be formed of a circular (e.g., cylindrical and/or frustoconical) member extending from a wall surface. However, other shapes are contemplated such as those including square and/or rectangular shapes as shown in FIG. 1C. Still further, the engagement or alignment feature may comprise a tongue and groove configuration such as that shown in FIG. 1B. Other configurations are contemplated such as for achieving a dovetail joint, a scarf joint, or some other joint. In any regard, while two engagement/alignment features are shown, it should be appreciated that the block may only contain one feature (centrally located or otherwise), or more than two. Still further, the block may include a plurality, such as an array or otherwise, of engagement/alignment features formed on one or more walls.

A building block with a flat top surface, e.g., without any projections or recesses on the top wall, may be desirable for capping a wall built of building blocks. By capping a wall with a building block with a flat top portion, a "cap block," a horizontal top plate may be placed on top of the cap blocks. The horizontal top plate may extend the length of the wall and be attached to the top wall of a number of adjacent cap blocks. The top plate may provide additional support and resistance to shear forces from wind and seismic activity, among others. Therefore, it may be desirable for the width of the building blocks be about equal to or near the width of a piece of lumber with standardized dimensional lumber sizes. For example, the width of the cap block or building block may be about equal or near the lumber standard of for a 2×12, which equates to about 1½"×11¼" (width), 19 mm×286 mm (width)). The top plate may include additional supports extending and attaching to the base or floor of the wall providing for additional support to the entire wall assembly. One or more openings may be provided in the blocks to provide a liquid drainage channel.

In another example, still referring to any of FIGS. 1, 1B, 1C, 1D, and 2, the block may include one or more openings 32 (in one preferred configuration, each block includes at least two openings, and/or may be configured for aligning with a block that is stacked in a staggered relationship). The openings may be positioned on the block such that upon stacking of two or more blocks that openings of the blocks become axially aligned. The alignment of the openings may extend through some or all of the height of a wall block assembly. The openings may be free of any material, or they may be filled with concrete, adhesive, plaster, reinforcing bars (e.g., rebar), gravel, other particulate material, or otherwise for increasing the structural integrity of the walls.

Figure 2:
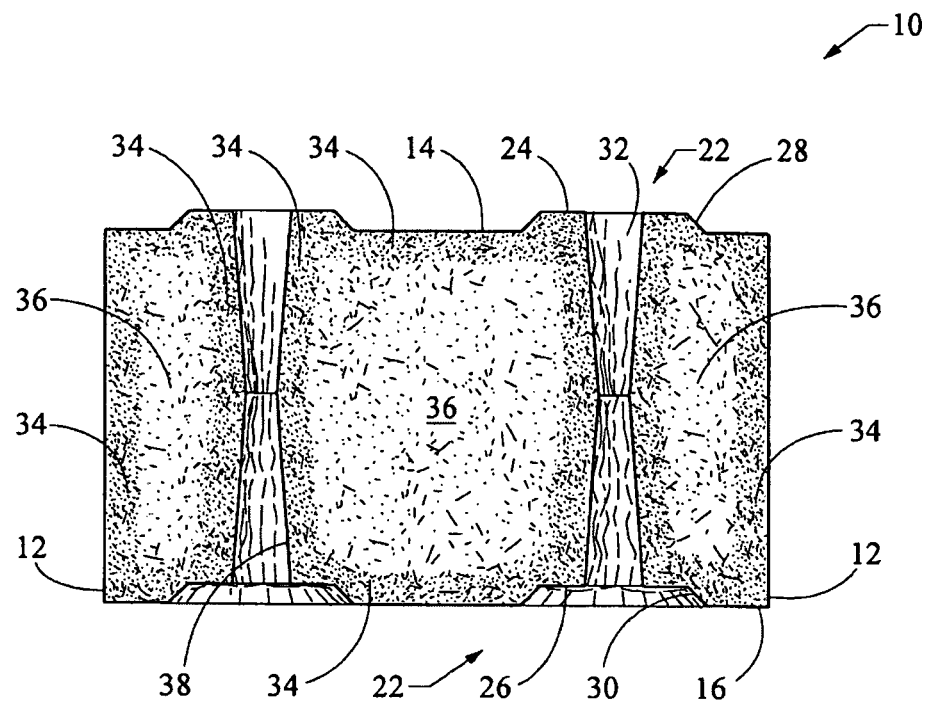
FIG. 2 illustrates a cross-sectional view taken through an embodiment of a building block.

The openings may be (i) of substantially constant cross-sectional size, geometry or both; (ii) of continuously varying cross-sectional size, geometry or both; or a combination of (i) and (ii). One possible approach is to employ an opening that has a profile that varies continuously or intermittently along its length, such as by starting with a larger opening at one end, constricting the opening size toward an intermediate location, and optionally then enlarging again toward an opposing end. For example, the opening may have a generally hour-glass configuration. Accordingly, the holes may be tapered, as shown in FIG. 2. The degree of taper can be large or slight. One configuration can be tapered for reducing the sectional area at a point along the length of the opening relative to the area at the outer walls by at least about 1%, from 1% to 10%, 1.5% to 2.5%. The taper may be in the form of an hour glass as shown in FIG. 2 (tapered at each end, where hole 32 is narrowest in the center of the block), or hole 32 can include a single taper (e.g. one having a generally constant slope) where the hole is widest at either the top or bottom walls and narrows gradually toward the opposite wall. The holes may be formed during the compression of the straw in the mold.

The opening formed through the block may be of any suitable size for allowing suitable reinforcing materials to be placed there though. It is contemplated that the openings may include a diameter (or other largest spanning dimension) between about 1 to 12 inches (3 to 30 cm), or about 2 to 9 inches (5 to 23 cm), or even about 4 to 6 inches (10 to 15 cm). In several specific examples, the openings include a diameter of 3 inches (8 cm), 4 inches (10 cm) or 5 inches (13 cm).

The inner wall of the blocks that defines the openings preferably will have a density that is approximately the same at the density at or within about 1 cm from the outer wall surfaces. Thus, the inner wall of the blocks that define the openings preferably will have a density that is at least about 5%, 10% greater or even at least about 20% greater than the lowest density of the concealed interior portion of the block.

In one preferred configuration the alignment feature and the opening are formed toward a central region of one of the walls. For example the openings may be formed in a central region with one or more flanking alignment features. The block may be substantially formed of agricultural by-products (e.g. straw stalks) that are compressed together and held together via natural agents (i.e. naturally occurring binders in the by-products) within the stalks, through added binders (i.e. binders in addition to any naturally occurring binder), or combinations thereof. In one configuration, a binder is added to improve the binding of the straw stalks. Preferably, the added binder is dispersed throughout the entire block, though it may be selectively dispersed. Though the use of inorganic binders is contemplated also, as taught in U.S. Publication No. 2005/0223671 (see, e.g., paragraphs 0037, and 0049), incorporated by reference, the added binder may consist essentially of an organic substance; the added binder may be free of any inorganic binder; the added binder may consist of a synthetically prepared material, or any combination thereof.

In one configuration, a binder may include a resinous material, more preferably a synthetically made resin, and still more preferably a resin that include one or more functional groups of nitrogen, carbon and oxygen resins. Resins for use in an added binder may be generally non-polar. They may include one or more aromatic moiety.

One particularly preferred added binder includes an isocyanate, a reaction product involving an isocyanate reactant, or both. The added binder may include, for example, a material (e.g. resin) including or consisting essentially of an aromatic isocyanate, aliphatic isocyanate, or combination thereof. The binder may be provided as a liquid, e.g., a liquid having a bulk density at 25 degrees Celsius of about 9 to about 12 lbs. per gallon (about 1 g/cc to 1.4 g/cc) and more preferably about 10 lbs per gallon (1.2 g/cc). A particularly preferred material includes or consists essentially of one or more aromatic isocyanates. The isocynate may be in the form of an isocyanate-terminated prepolymer (e.g. a polyester prepolymer) with a range of NCO weight from about 10.0% to 45.0%, more specifically about 15.0% to 20.0%, and still more specifically about 18.0% to 35.0%. or otherwise. The isocyanate may be in the form of an isocyanate-terminated polyester prepolymer with a viscosity of 100 to 1,700, 150 to 1400, 200 to 1200 mPa·s @ 25° C. (Brookfield viscosity method). The isocynate may be in the form of an isocyanate-terminated prepolymer (e.g. a polyester prepolymer) with an equivalent weight of about 100 to 350, more preferably about 175 to 275, and still more preferably about 200 to 250. The isocyanate may be poly-functional (e.g., it may be bi-functional). One example of a binder includes a polymeric diphenylmethane diisocyanate (MDI). An example of a preferred commercially available isocyanate material for use as an added binder herein is Bayer Mondur® 541.

Without intending to be bound by theory, it is believed that the selection of an appropriate added binder for use herein permits for the possibility of achieving high integrity covalent and/or van der waals bonds with agents on the straw stalks for bonding the binder to the stalks and thus binding adjoining stalks together via the added binder. These chemical bonds are believed stronger and more stable than mechanical linkages, so less resin may be used to achieve similar, or greater, performance with lower adhesive loadings compared to other binders such as Phenol Formaldehyde (PF) resin based binders. They also provide a relatively lower toxicity alternative to typical PF binders historically used. Though common commercial grades of MDI tend to be expensive. Lower resin loading may have the potential to save money, which can help to offset the increased cost per unit of MDI. Further without intending to be bound by theory, it is believed that due to the likelihood that the surface of straw stalks will be rich in hydroxyl groups (—OH), isocanate resins that are terminated in isocyanate groups (—N═C═O), may be able to react with the hydroxyl groups on the straw, for possibly forming urethane linkages. Thus, the blocks herein may include agricultural by-products (e.g. straw stalks) bonded together with urethane linkages.

Further without intending to be bound by theory, one or a combination of factors such as the non-polar, aromatic component of MDI containing binders, and the existence of the urethane linkages as part of a cross-linked network help to make cured MDI containing binders resistant to hydrolysis. Some advantages associated with using MDI include greater tolerance for higher moisture content in the straw during or after processing (e.g., during manufacture of the blocks, moisture content may be higher than about 14% by weight, however, it is preferred that the block be manufactured from straw having a moisture content of less than about 14%), lower activation temperatures may be possible, which could result in energy savings in the production of the blocks, or both. Thus, methods herein, in general (and not necessarily limited to those employing MDI in an added binder), may contemplate a step of forming a block in the presence of heat and pressure (e.g., according to the compression heating taught herein) while the straw has a moisture content greater than about 14% by weight.

The invention herein also contemplates the possibility of employing a suitable art-disclosed mold release agent in the methods herein. It may be applied to the straw stacks with the binder (e.g., by mixing with the stalks and binder), it may be applied to a mold surface, or both.

Though it is preferred that the added binder herein will be free of any formaldehyde, phenolics or reaction products thereof, optionally, such materials may be used. For example, it may be possible to employ a Phenol Formaldehyde (PF) based resin (e.g., a cured waterproof resin) as a binder. Such PF resins or compounds containing them may be prepared by reacting phenol and formaldehyde (in combination with additives and/or extenders) in a high pH (alkaline) water solution. One approach for a reaction is to stop the reaction prior to completion, to avoid complete cure of the resulting thermoset polymer. Instead, the reaction may be stopped after only a relatively short time, while there has been a relatively low degree of conversion. The resulting short chain PF molecules, when employed for binding stalks herein may thus penetrate into the straw cell walls or hollow spaces inside straw cells. Curing the resin converts the soluble, short chain molecules into an insoluble three-dimensional network, and primarily forms mechanical bonds between the straw and resin.

The binders herein may comprise a naturally occurring binder (e.g. constituents naturally found in the stalks, constituents derived from other sources (e.g. plant oils), or both). The natural binder (and/or added binder) may be substantially free of formaldehyde. An example of one such added binder may be derived from one or more vegetable oils. In another configuration it is contemplated that the binder may comprise chemically configured (or synthetic) binder such as formaldehyde or otherwise. Other configurations are contemplated.

The amount of binder added to the straw stalks is at least partially based upon the size and density of the block to be formed. The quantity of added binder may range up to about 10% by weight or higher of the final weight of the block. For example, it may be employed in an amount between about 0.1 wt % to 5.0 wt %, more preferably about 0.5 wt % to 3.0 wt %, and even more preferably 1.0 wt % to 2.0 wt %, of the final weight of the block. In one configuration the added binder may range between about 0.5 wt % to 2.0 wt % of the block. For example, it is contemplated that a block weight from about 15 lbs to 60 lbs may contain about 3 to 50 liquid ounces, 5 to 30 liquid ounces, 6 to 12 liquid ounces, or otherwise, of added binder. In one embodiment of the block, it is contemplated that the block may contain 11 to 13 liquid ounces of added binder. Other configurations are contemplated.

The weight ratio of binder to straw in the final block will preferably be less than about 1:10, and more preferably less than about 1:20. The weight ratio of binder to straw in the final block will preferably be more than about 1:1000, and more preferably more than about 1:200. For example, the weight ratio may range from about 1:80 to about 1:40.

The binder may comprise an activatable material. Suitable activatable material may be activatable by an applied stimulus such as one or more of heat, ultraviolet, microwave, infrared, pressure, moisture or other the presence of another chemical ingredient. When such a binder is used, upon compression of the agricultural by-products (e.g. straw stalk) within the mold assembly, energy may be applied to the block to bind the by-products.

Optionally, the block may include one or more additives for improving the strength of the block, fire resistance, flame retardancy, mold resistance such as biocides to prevent mold or fungi growth, pest control, or otherwise improve the longevity of the block. Such additives may include borax, clay or otherwise. They may include a phosphorous containing compound. The building block may also be free of small particle fillers (e.g. fillers having particle sizes on the order of sawdust particle sizes). Examples of possible additives or other possible ingredients are disclosed in U.S. Pat. No. 6,951,080, and co-pending U.S. patent application Ser. No. 10/807,946 (filed Mar. 24, 2004, U.S. Publication No. 2005/0223671) and Ser. No. 12/187,779 (filed Aug. 13, 2008); the contents of which are hereby expressly entirely incorporated by reference for all purposes.

One particularly unique feature of the present invention includes the formation of one or more rigid walls or portion about or within the block. The rigidity of the walls and/or block may be achieved through the prolonged application of heat and pressure to the block, wherein the longer the block is subjected to heat the deeper the heat enters the block thereby causing natural and/or added heat activated binders to attach the straw stalks together, but without deteriorating the outer or other exposed wall surfaces. Accordingly, the longer the block is heated, the deeper the rigidity of the material may extend into the block. The heating duration of the block may range from about 15 minutes to 2 hours, and more preferably about 20 minutes to 1 hour. Most preferably, the block is heated for a duration of 25 to 35 minutes at a wall temperature (the temperature being measured from at least the outer surface of the block to 1 inch (3 cm), from the outer surface, within the block) of about 275 to 350 degrees Fahrenheit (135 to 177 degrees Celsius). Desirably, the block is in a state of compression while being subjected to those conditions. For example, a pressure up to about 2000 psi, and more preferably up to about 1250 psi, is applied during the heating (e.g. for the entire heating period).

The formation of rigid walls may include two opposing rigid walls, surrounding rigid walls such as the main walls and sidewalls shown in the drawings, or even all of the walls of the block may be rigid. The rigid walls of the block may be suitably dense that they can and do receive and retain fasteners for attachment of items to the blocks (e.g. panels or members might be nailed, stapled or even screwed, and will resist pull-through) or for the attachment of blocks to each other.

Figure 9:
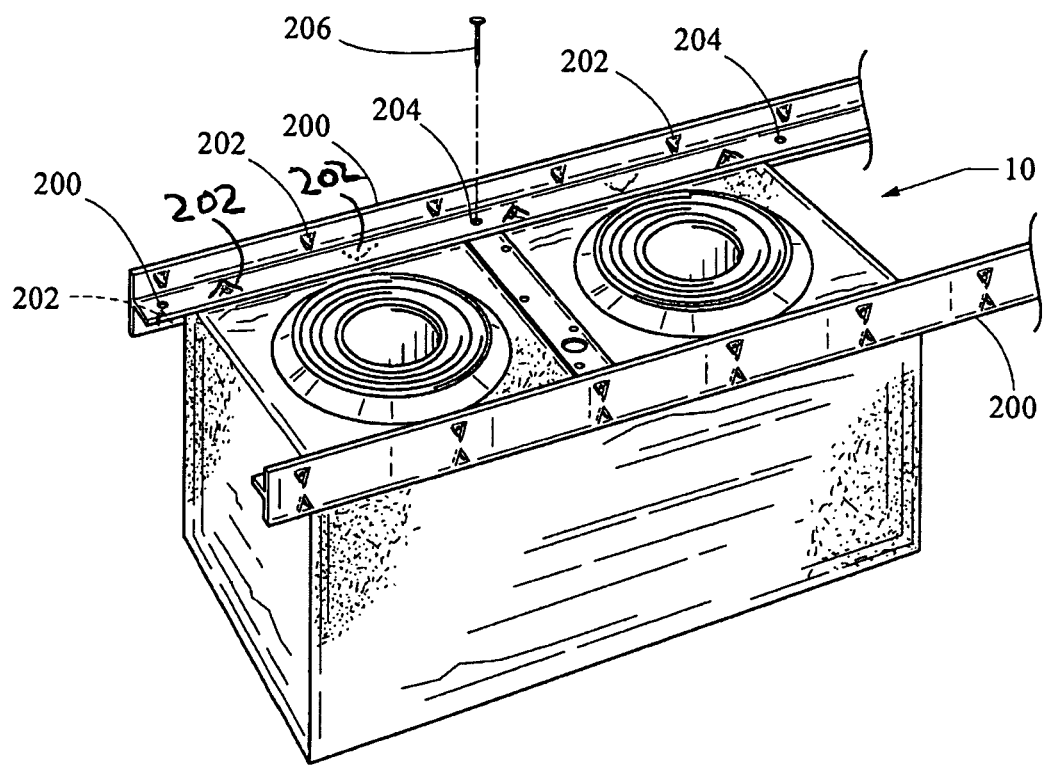
FIG. 9 illustrates a configuration of an attachment bracket.

One possible approach for attaching blocks herein to another structure may include employing a suitable bracket structure (e.g. plurality of spaced rails having a flanged side wall and being connected by one or more cross bars) that commonly joins a plurality of blocks. For example, as shown in FIG. 9, a bracket 200 can be attached to a stack of blocks at the wall or corner of each individual block 10. The bracket 200 secures the blocks together adding stability and additional support. The bracket can have a suitable structure, such as outward projections (e.g., cleats 202 having a free end that projects away from the bracket), for attachment to the blocks; the bracket may attach to the blocks by nail 206, by adhesive, screw, by some other fastener, or mechanical interlocking, or a combination thereof, such as through hole 204 of the bracket 200. The cleats may alternately be arranged/oriented (e.g. one up, the next down, then up and so forth) so that the cleats alternate between attaching to adjoining blocks. The cleats may also be angled so they are inserted into the blocks perpendicular to the surface of the block or at angles of less than 90 degrees. The side walls of the block may abut the flanged side walls of the rails. Of course, as will be recognized, the rigid outer walls of the block also provide improved dimensional tolerance structural integrity and strength of the block, and even provide the ability to machine the block.

As discussed, the density, rigidity, or both of the walls of the blocks may vary depending upon the depth where measured from an outer surface. It can be appreciated that the structures herein, having a higher densified outer wall structure effectively forms a skin on an outer portion of the wall or block, the skin surrounding (e.g., entirely surrounding) an interior portion with one or more lower densities. The thickness of the "skin", where the density of the blocks is within about 5% of its maximum density may extend about 0.5, 1, 2, 3, 4 or more inches (1, 3, 5, 8, 10 or more centimeters) deep into the block. The density of the block and/or characteristics of the straw stalks (e.g. hardness, compressive strength, or otherwise) may thus be considerably different at greater depths. In one configuration, it is contemplated that the rigidity of the wall extends to an oppositely located wall (e.g. top and bottom walls, mains walls, side walls, or otherwise), wherein the characteristic of the straw stalks are generally constant from one wall to an oppositely located wall. Still further, the entire block may be rigidly formed, or have a density that differs by less than about 15% from the maximum density (and more preferably less than about 10% from the maximum density) of the block at any point within the block, or where the characteristics of the material throughout the block otherwise are generally constant.

In terms of rigidity of the walls or even the entire block, for purposes of this description, this feature may be correlated with hardness. It being appreciated that rigidity and hardness are generally related. That is as hardness increase for the blocks herein, so does rigidity. In one aspect, the hardness of the block may be determined in terms of wood, such as the Janka wood hardness measurement. The Janka test measures the force required to embed a 0.444 inch (11.28 millimeter) steel ball into wood to half its diameter. It is contemplated that the rigid material of the walls or block include a Janka hardness of at least about 25 lbf, 50 lbf, 75 lbf, 100 lbf, or even at least about 150 lbf or more (11 kgf, 23 kgf, 34 kgf, 45 kgf, or even at least about 68 kgf or more).

The rigidity of the block may be based upon the holding force of mechanical fasteners. It should be appreciated that the holding force of the rigidly formed portions of the block is greater than holding force of non-rigidly formed portions of the block. Such holding force may evaluate in terms of standard holding force of mechanical fasteners for plywood, particle board, wood boards or otherwise. In one configuration, it has been found that the present invention is capable of a holding force of at least about 25 lb, 50 lb, 100 lb or more pounds. Further, it is contemplated that the resulting block would comprise rigid wall member or rigid block portions having a holding force between about 50 lb to 100 lb, or more. Such forces may be based upon 1⅝" drywall screw threaded to approximately 1" to 1⅛" into the block of the present invention. This is the anticipated amount a typical drywall screw would penetrate the block of the present invention upon penetration and dimpling of a ½" drywall board. It should be appreciated that the holding force may be at least partially based upon the compression or the straw stalks and/or binding agent used with the block.

As seen from the illustrations herein, the methods herein contemplate shaping the block and/or otherwise forming openings in the blocks as part of the molding operation. For example, a tool may be used for molding that prevents material from entering the regions where the openings are intended. Another possible approach made possible by the present invention (e.g., due to the rigidity and hardness of the compressed and heated materials) is the ability to machine the block (e.g. cut, drill, route, shape or otherwise). Among other advantageous, during building with the blocks they can be machined to allow for electrical wires, pipes or other building materials to extend at least partially there through. In one particular aspect, the blocks may be precut or otherwise preformed with channels or otherwise. Accordingly, the present invention also contemplates possible steps of machining the block to a desired size or shape.

Figure 1D:
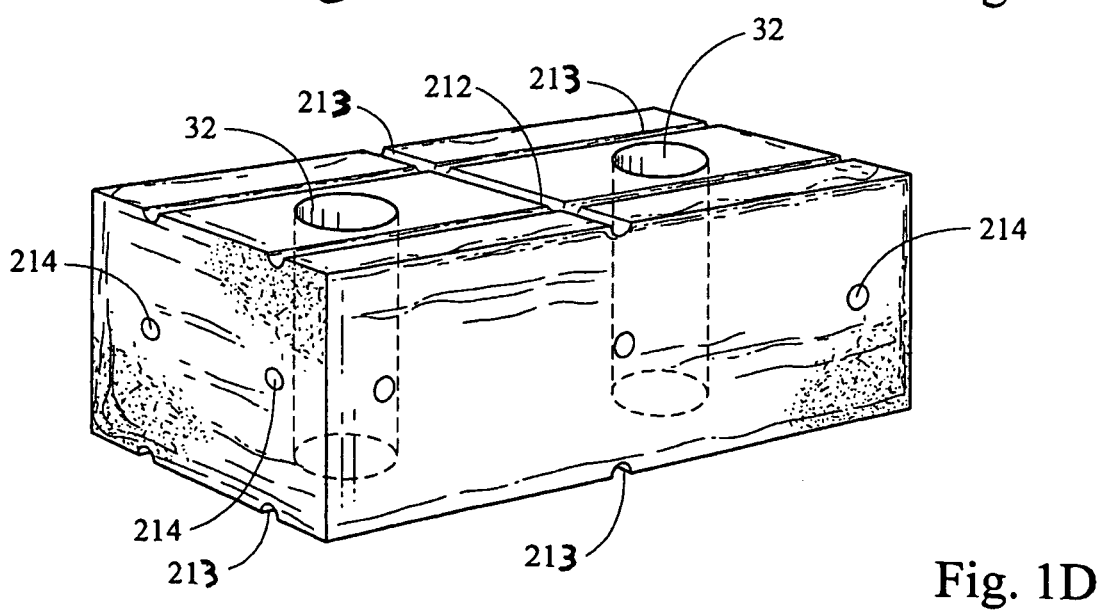

For example, referring to FIGS. 1B, 1C, 1D, 3A, 3B, numerous configurations of blocks are shown. While some blocks contain multiple machine and/or molded configurations, it should be appreciated that each machined and/or molded configuration shown in the drawings (e.g. cut out, drill hole, routed portion, or otherwise) may be used separately or in combination with each other With specific reference to FIG. 1B, the block may further be defined (e.g., by machining and/or molding) to include a tongue and groove configuration 210 for alignment and/or securing stacked blocks together. With reference to FIG. 1D, the block may further include one or a plurality of grooves 213, which may be advantageously used to house wires, cables, pipes or other commonly used housing or building components. Still further, the machined or formed block may include one or more holes 214 for running wires, cables, pipes or otherwise. Still further, it should be appreciated that the opening 32 formed through the block may be machined or formed.

Referring to the drawings, several examples of the wall and block are shown. Though shown in connection with one block, features depicted can be combined and/or substituted with features of other blocks. For example, grooves, openings, projections or other features shown in one illustration may be employed in one of the others.

With reference to FIG. 2, a first configuration of a wall density and/or rigidity profile is shown. In this configuration, the exterior portion 34 of all of the walls includes a greater rigidity than an interior portion 36 of the block. This is exemplified schematically through the density of exaggerated dot hatchings shown in the drawings. The higher the density the more rigid and/or dense will be the block in that portion. The walls forming the block are each rigidly formed which extends at least partially through the block. In another example, the entire block may be rigidly formed.

As shown in the drawings, optionally the one or more openings 32 formed through the block may be defined by a suitable wall (e.g., an interior-disposed cylindrical wall) 38 also formed of a rigid material. In this respect, the enhancement of properties from the cylindrical walls may also extend towards a central portion of the block, or selective localized enhancement of properties can be achieved at desired locations within the block.

As previously mentioned, the present invention further contemplates methods of forming building blocks, particularly the building blocks as described herein.

Preferably, the method of forming a building block includes compression and heating of the straw stalks. Such compression and heating is particularly advantageous for forming the rigidity of the walls and block. It is contemplated that the straw stalk is compressed, heated or both to attach the straw stalks and/or activate binder. The bonding of the stalks with each other and with the binder effectively densifies the bonded vicinity, thereby allowing to form the rigidized and/or densified walls. The form of the building block may be constructed in a single step and not as a layer by layer build up, resulting in a building block that is substantially, if not completely, free of layers. The building block may also be free of a separable shell, internal or external structures (e.g., film, screen or otherwise) that separate layers.

As indicted previously, the methods herein may include the step of selecting and preparing the waste agricultural by-products (e.g., straw stalks). The selecting step may be part of a process of sorting the waste by particle or stalk size. The preparation step may include preparation (e.g. cleaning, removing contaminants, drying, otherwise conditioning) of the stalks and optionally may include chopping, shredding or otherwise cutting the stalks into predetermined lengths. Straw conditioning may be done in a dry state, free of any moisture, steam or otherwise. Moreover, the method may be free of any refining step. The stalks are then placed in a mixing device, wherein a binder is added. The binder may be added during mixing or rotation of the straw stalks.

Figure 7:
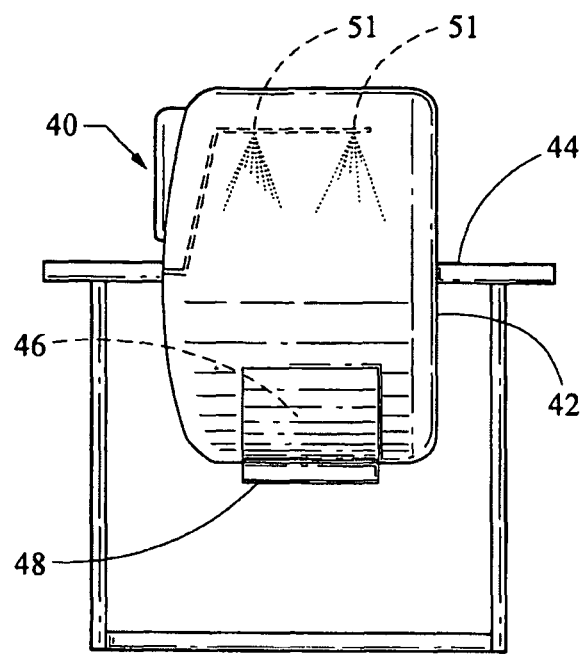
FIG. 7 illustrates a configuration of a mixer.
Figure 8:
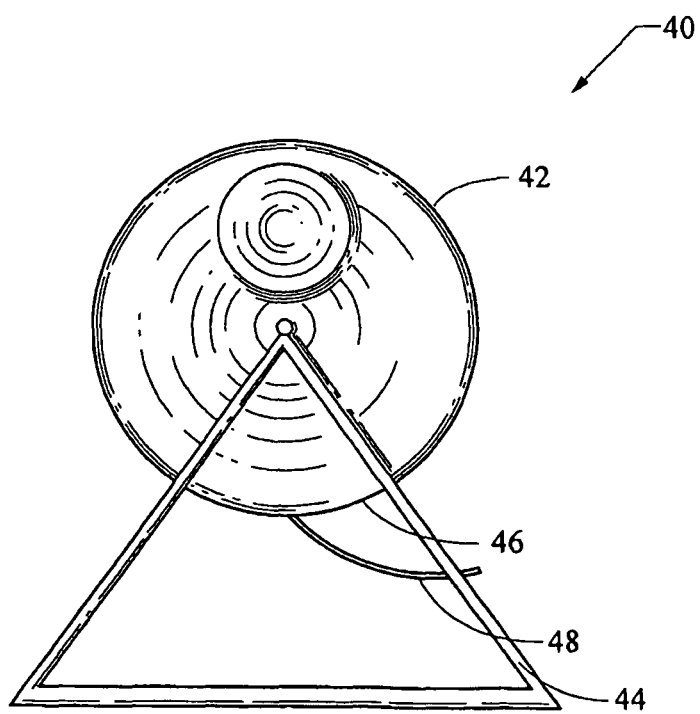
FIG. 8 illustrates a configuration of a mixer.

Referring to FIGS. 7 and 8, one configuration of a suitable mixer 40 is shown, which may include a suitable motor or manual handle for rotation. The mixer includes a rotatable barrel 42 and support structure 44. The mixture also may include an opening 46 and door 48 for insertion and removal of straw stalks. Optionally, the mixer may further include a spray assembly 49 including one or more nozzles 51 for the introduction of binder with the waste agricultural by-products (e.g., straw stalks). The spray assembly may provide a continuous and/or intermittent stream of a binder, which may or may not be applied during rotation of the mixture of the waste agricultural by-products (e.g., straw stalks). Alternatively, the spray assembly, and optionally the barrel, may be controllable through an automated controller to mix and/or apply the binder to the waste agricultural by-products (e.g., straw stalks) such that the binder is applied sufficiently (e.g. amount, dispersion, or otherwise) throughout the straw stalks, or selectively only to portions of the waste agricultural by-products (e.g., straw stalks).

Figure 4:
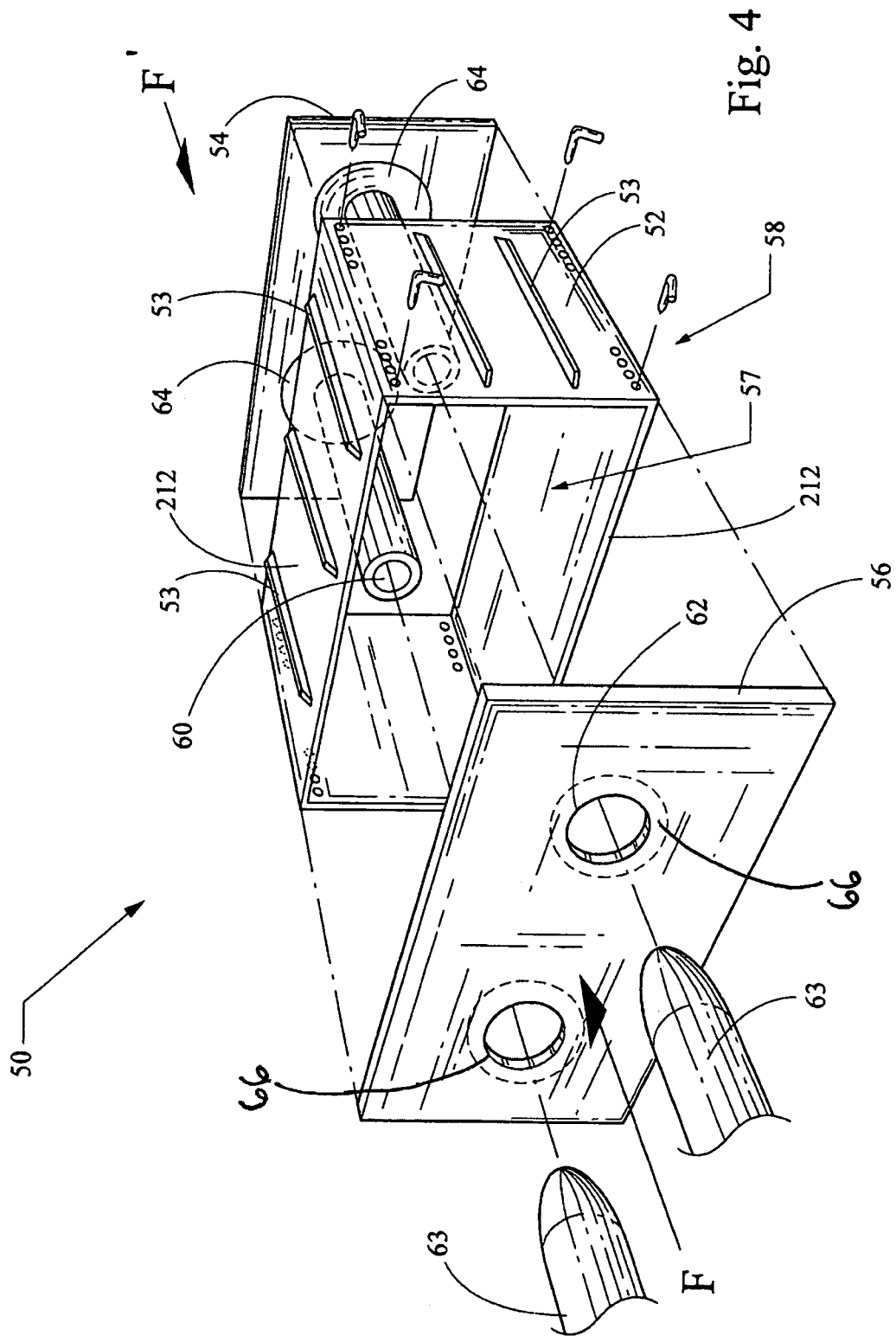
FIG. 4 illustrates an embodiment of a mold for forming a building block.
Figure 5:
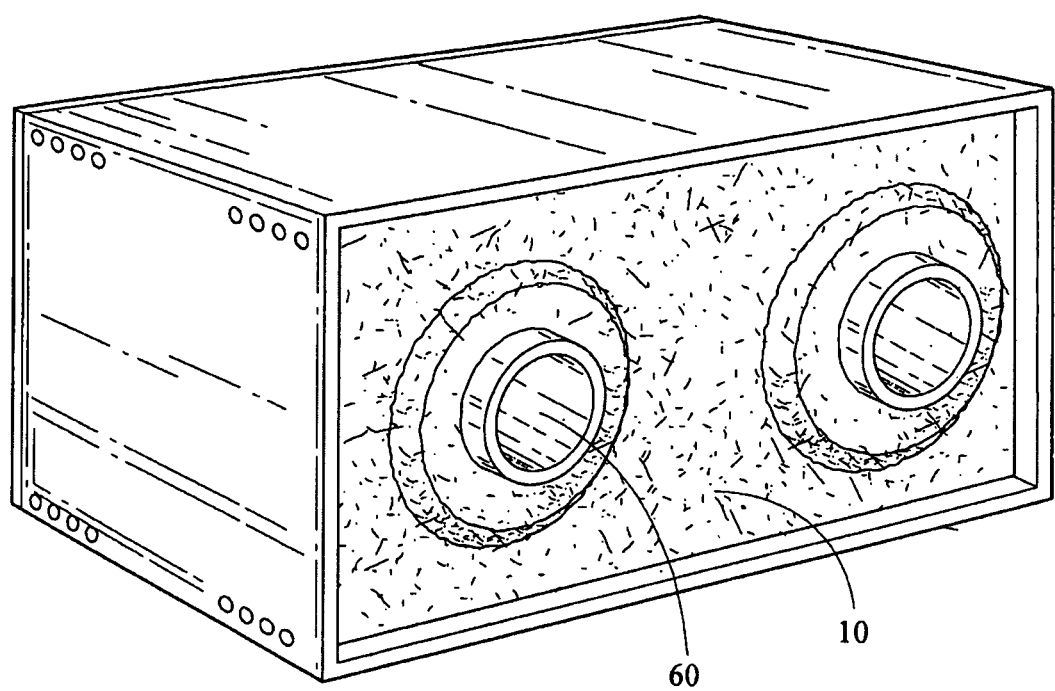
FIG. 5 illustrates an embodiment of a mold component from FIG. 4.

The method further contemplates the use of a mold for placement of the waste agricultural by-products (e.g., straw stalks) during compression and/or heating. The mold preferably is shaped to correspond substantially to the final shape of the resulting building block and is suitable in strength and material to withstand the pressures and heat applied to the waste agricultural by-products (e.g., straw stalks). Referring to FIG. 4, an example of a configuration of a mold assembly 50 is shown. The mold assembly includes a shape corresponding to desired shape of the main and side walls of the building block. The mold also includes mold sidewalls 52. The mold further includes a first wall portion 54 and a second wall portion 56, wherein at least one of the first wall or second wall portions is moveable to cause compression of the waste agricultural by-products (e.g., straw stalks) as shown by the Force vector arrows F and F' in FIG. 4.

Figure 10:
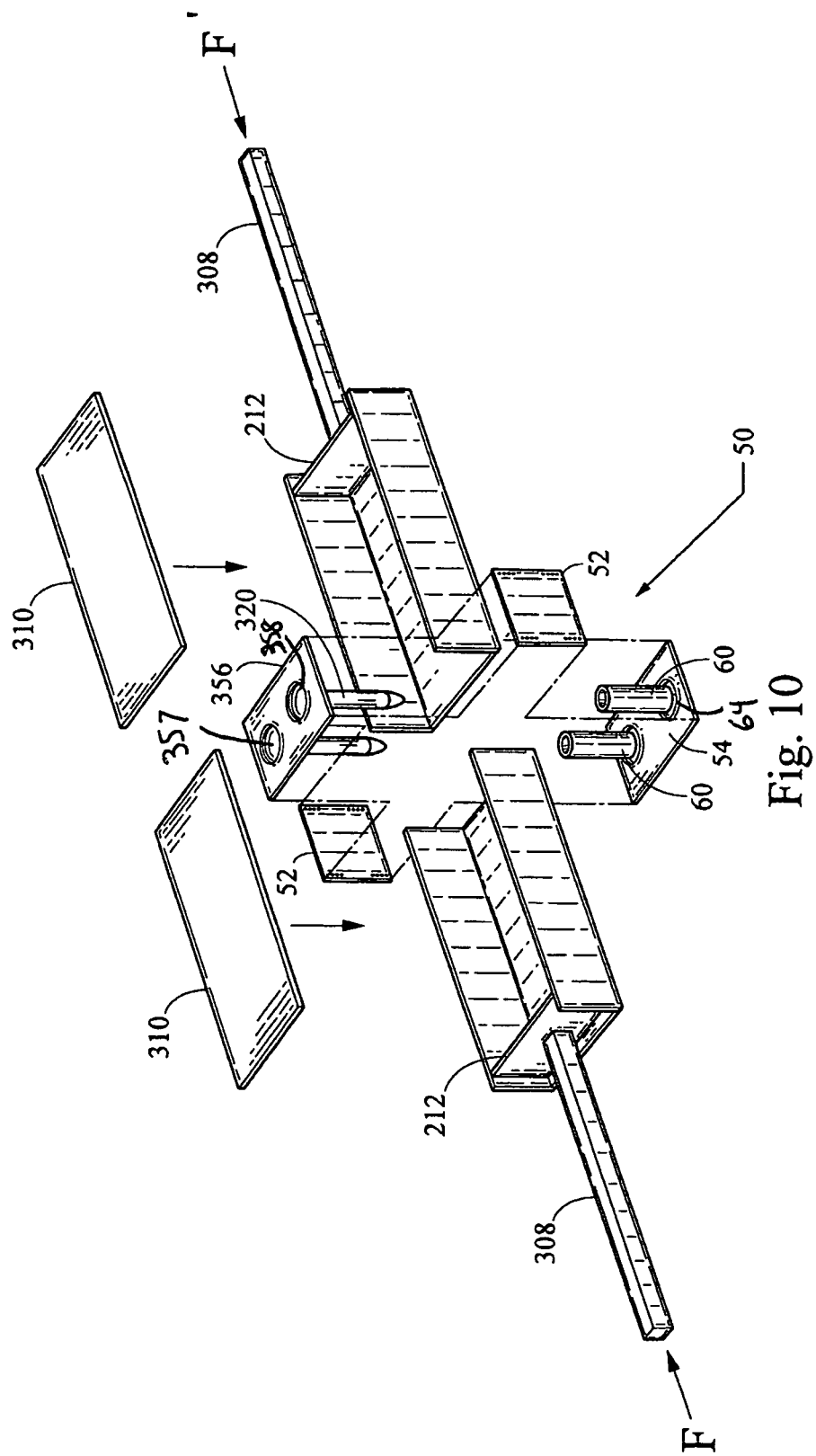
FIG. 10 illustrates an embodiment of a mold for forming a building block.

FIG. 10 depicts another configuration of a mold assembly 50 where two rams 308 are used to apply opposing forces F and F'. In FIG. 10, the mold assembly is configured so that mold main walls 212 are moved by the rams or other suitable means to compress the straw and the straw is dispensed from hopper lid 310. In FIG. 10, the six walls forming the mold; mold main walls 212, mold sidewalls 52, first wall portion 54, and second wall portion 356 may be held together by a suitable joint, such as dove tails. In FIG. 10, projections 320 extend from second wall portion 356 and are received by cylinders 60. In one embodiment, projections 320 and cylinders 60 meet half way within the mold when the walls are joined; projections 320 and cylinder 60 each may be tapered to allow for the formation of the hour glass shape opening illustrated in FIG. 2. Projections 320 and cylinders 60 may also have pathways for air to flow (e.g. openings along the surface of projection 320, projection 320 may be hollow allowing pressurized air to flow into the openings along the surface of projection 320 and escaping through opening 357 on second wall portion 356) out of the mold when the mold is compressed so that air pressure does not build up in the mold during compression; these air passage ways do not permit straw to escape, only air. Second wall portion 356 may also include a projection 358 for forming the recess portion of the engagement feature of the building block, the first wall portion 54 may include a recess 64 for forming the projection portion of the block alignment feature (these features may be interchanged so that the recess may be with second wall portion 356 and the projection may be with first wall portion 54). After the block is compressed and formed, the mold is released from the compressor and simultaneous transferred to at least 2 conveyor belts. The conveyor belts apply force to the mold holding the mold together, after the mold has dwelled for the requisite time, the mold is released from the conveyor belt where it dissembles from the block on its own.

It should be appreciated that the material and structure forming the mold may comprise any suitable material and structure adapted to withstand the applied pressure to the straw stalks. In one configuration the mold assembly may comprise substantially of metal (e.g. aluminum, steel or otherwise). In one configuration, the mold may be comprised of hard anodized aluminum. However, it is also contemplated that the mold may comprise a material based upon the binder used to hold the straw stalks together. For example, with activatable adhesives or binders, the mold may be configured of a material conducive to the type of energy being applied to the waste agricultural by-products (e.g., straw stalks). Optionally, one or more, or even all, of the components forming the mold assembly may include a layer for assisting in the removal of the block from the mold assembly. This may include a non-stick, release layer or the like. The layer may comprise a layer formed with the component of the mold assembly or it may comprise a layer applied periodically to the mold (e.g. a non-stick spray coating). The coating may be a polymeric coating (e.g., a polyolefin or halogenated polyolefin, a silicon containing material, or a combination thereof). Preferably, any coating used is environmentally friendly and may be generally nontoxic, degradable, and/or recyclable. The coating may also be a mold release agent; a commercially available example is Releasomers SU-3 Solvent.

As shown, the mold 50 may include one or more reinforcement features for maintaining the shape of the mold during forming of the block. Suitable reinforcement features 53 are shown in FIG. 4 and, which comprise a plurality of rib members extending about the circumference of the mold.

In one configuration of the mold assembly, the second wall portion 56 is fixedly attached to the mold sidewalls 52 and mold main walls 212, through permanent (e.g. welding or otherwise) or non-permanent (e.g. fasteners) attachment means such as locking feature 58. This attachment is suitable to provide a counter force F to the force F' being applied by the first wall 54, through a compressing device, as described herein or otherwise. The mold also includes an opening 57 for extending through the mold for receiving the first and second wall portions. The opening allows the first wall portion to travel through the mold, towards the second wall portion, during compression of the waste agricultural by-products (e.g., straw stalks).

Preferably, the mold assembly includes a locking feature 58 for limiting movement of the second wall portion prior and after compression of the waste agricultural by-products (e.g., straw stalks) and for limiting movement of the first wall portion after compression. This is particularly advantageous so as to maintain pressure against the waste agricultural by-products (e.g., straw stalks) during heating of the block. In the example shown, the locking feature may comprise a plurality of holes, extending in a direction of the applied force, and connecting or locking pins. In the configurations shown, a series of holes are located on a top and bottom portion of each mold sidewall 52; the holes can also be placed in the mold main walls 212.

Optionally, referring to FIG. 4, the first and/or second wall portion 54, 56 of the mold assembly may include projections for forming the openings through the building block. In the configuration shown, the first wall portion 54 includes an elongated cylindrical member 60 adapted to extend through an opening 62 of the second wall 56 portion during initial assembly and further during compression of the waste agricultural by-products (e.g., straw stalks). Additional members 63 may also be inserted into the cylindrical member 60 and opening 62 (opening 62 may also permit trapped air to escape during the compression and heating process, avoiding air pressure build up in the mold while it is compressed) to prevent straw or other by-product from entering the cylindrical member or exiting through opening 62. It should be appreciated that other cross-sectional shapes for the elongated members and openings are available including square, oval, rectangular or otherwise. It is contemplated that the diameter of the cylindrical member may comprise a size substantially similar to the opening formed through the block.

In another optional feature of the mold assembly, the first and/or second wall portions are shaped to form the alignment features (e.g. projection and recess) of the block. Referring again to FIG. 4, the first wall portion 54 includes a recess 64 for forming the projection portion of the block alignment feature. The recess includes corresponding components (e.g. projections and side walls) as discussed with the block. The second wall portion 56 may form a projection 66 for forming the recess of the block alignment. The projection may also include corresponding components as discussed with the block.

In one configuration of a method for forming the building block using the mold, second wall portion 56 may be locked into place with locking feature 58. Additional members 63 are inserted into opening 62, through opening 57, and into cylindrical member 60. Waste agricultural by-products (e.g., straw stalks) are loaded into the molding from opening 57. After the waste agricultural by-products (e.g., straw stalks) are loaded, first wall portion 54 is compressed and pushed into the mold by F'. The first wall portion can be partially guided by additional members 63 into the mold. After the agricultural by-products (e.g., straw stalks) are compressed to a desired amount, first wall portion 54 may be locked into place by locking feature 58. Additional members 63 are subsequently removed leaving cylindrical member 60 protruding from opening 62 and the mold is heated at a desired temperature and time. After the heating process is complete, the mold assembly can be cooled. The building bock is then ejected from the mold by releasing locking feature 58 and removing wall portions 54 and 56, or both. The building block can have any laterally projecting straws, or other fibers which would give an appearance of "fuzz", removed from its surface.

The method may include a step of applying force by the use of a compressor adapted to apply force F' to the first wall portion. The compressor may include a first portion configured to apply force against the first wall portion of the mold assembly and a second portion to apply a counter force F to the second wall portion in response to the applied force against the second wall portion. It should be appreciated that any suitable compressor may be used with the present invention. The force may be applied in a vertical direction, in a horizontal direction, or a combination.

A preferred compressor of the present invention is suitable for applying a force to the straw stalks within the mold assembly to generate a suitable pressure. It is contemplated that the pressure applied to the agricultural by-products (e.g., straw stalks) may be in the range of about 100 to 2000 psi, which may be dependent upon the desired density and weight of the block. Desirably, the pressure applied is below about 1500 psi, and more preferably below about 1250 psi. For example, pressures may range from about 400 to 1500 psi, or more preferably about 1000 to 1200 psi, or otherwise. As previously mentioned, compression of the agricultural by-products (e.g., straw stalks) may be maintained through the locking feature of the mold assembly.

As previously mentioned, the present invention further contemplates heating the compressed agricultural by-products (e.g., straw stalks). This may be particularly advantageous to activate any activatable binder, wherein as heat travels through the block material the activatable material is activated and binds the straw stalks to form rigid material. Accordingly, the longer the block is heated, the deeper the heat travels and the deeper the rigid material extends into the block. It should also be appreciated that such heat and pressure also causes the natural binding material within the straw stalks (e.g., lignin, starch, wax or other carbohydrate) to bind the straw stalks together.

Preferably, as for other agricultural by-products, the straw stalks are heated while within the mold assembly. Through the locking feature of the mold assembly, the shape of the block can remain generally constant during heating. The compressed straw within the mold assembly is placed into a heater or otherwise heat is applied to the straw stalks to assist in the formation of the block. Preferably, the heat is sufficient in temperature and application time to cause activation of any heat activatable binder mixed with the straw stalks. However, as previously mentioned other forms of energy may alternatively or additionally be used to cause activation or bonding of the binder.

In one example (useful as well for agricultural by-products other than straw stalks) the heater may comprise an oven, so that a heat atmosphere surrounds the mold and its contents. Localized heating may be employed, so that only a portion of the mold and its contents are selectively heated. Preferably, the oven has a corresponding shape to that of the mold assembly to reduce required energy needed to heat the oven and hence the mold assembly. Alternatively, referring to FIG. 6, the heater may comprise a conveyor oven 110 wherein the mold assembly is placed in one end of an oven and exits an opposite end of the oven. Still further, the heater may comprise heated plates such as hot plates. Such heated plates may be incorporated or formed with the walls forming the mold assembly including any of the sidewalls, top wall or bottom wall. Other forms of ovens may be used including a microwave based oven using electromagnetic waves frequencies that are absorbed by moisture in the straw and converted into atomic motion, and which can result in heating the block. Other forms of heating include solar powered heater tubes, or other sources of potential heat or energy that can be used in remote locations or are renewable sources of energy.

The application of energy (e.g. heat or otherwise) to the block may be based upon the material forming the mold assembly, thickness of the block, type of materials as the agricultural by-products (e.g., straw stalks), type of binder or otherwise. It is contemplated that any application of heat may require a predetermined temperature and length of time to which the block is subjected. For example, it is contemplated that the block may be heated to a temperature range of about 200 to 400° F. (93 to 204° C.) (more preferably about 275 to 325° F. (135 to 163° C.) at a block outer wall surface or to a depth of about 1 to about 3 cm). Preferably, the temperature applied to the block is below a scorching or burning temperature of the agricultural by-products (e.g., straw stalks). It is contemplated that the temperature applied to the block will be below about 400° F. With regards to the amount of time the block is subjected to heat, this may also be based upon the amount of heat being applied to the block, wherein theoretically the higher the temperature the shorter the time period required to heat the block to a desired depth. For example, it is contemplated that the block may be heated at the above temperature for a time period of about 0.2 to 1.5 hours, or about 25 to 35 minutes or otherwise. After the building block is heated for the desired period of time, the block may be allowed to cool or dwell for a period of 25 to 35 minutes at ambient conditions before removal from the mold.

In one embodiment, the present invention may also include a temperature sensor for determining the temperature of the oven, mold assembly, block or combinations thereof. In one configuration, the temperature sensor comprises a probe configured to be inserted (e.g. ¼", 1", 2", 4" or more) at least partially into the block. Such a probe preferably will be used for determining one or more internal temperatures of the block as well as the temperature of the walls of the building block.

In view of the foregoing, the following comprises a first example of forming a block of the present invention, which comprises a largely mobile configuration. The method includes assembling, cleaning, sorting and drying a substantial quantity of agricultural by-products and particularly straw stalks. The straw stalks are divided into or otherwise assembled to a predetermined weight (such as approximately 25 lb, 30 lb 40 lb or otherwise) based upon the desired weight, density or size of the block.

The selected group of straw stalks are then placed into a mixing device, as described herein, and mixed throughout with an activatable binder. Optionally, the mixing device may also mix other ingredients, also as described herein, such as fire retardant, mold or mildew inhibitor, pest controller, or otherwise.

The mixture is then placed in the mold assembly of the present invention and enclosed. The mold assembly is then placed in a compression device to compress at least one wall of the mold assembly to compress the straw stalks located therein. Once a desired pressure is attained, the walls of the mold assembly are locked in place through the locking device.

The compressed straw stalks and mold assembly are heated through a heating device at a predetermined temperature and time period. Preferably, the temperature level and time period of applied heat is based upon a desired density and/or rigidity depth of the block. Upon completion of the heating to the block, the mold assembly is allowed to cool and the block is removed or ejected. Upon removal, additional blocks may be made sequentially or in parallel with a plurality of mold assemblies.

Figure 6:
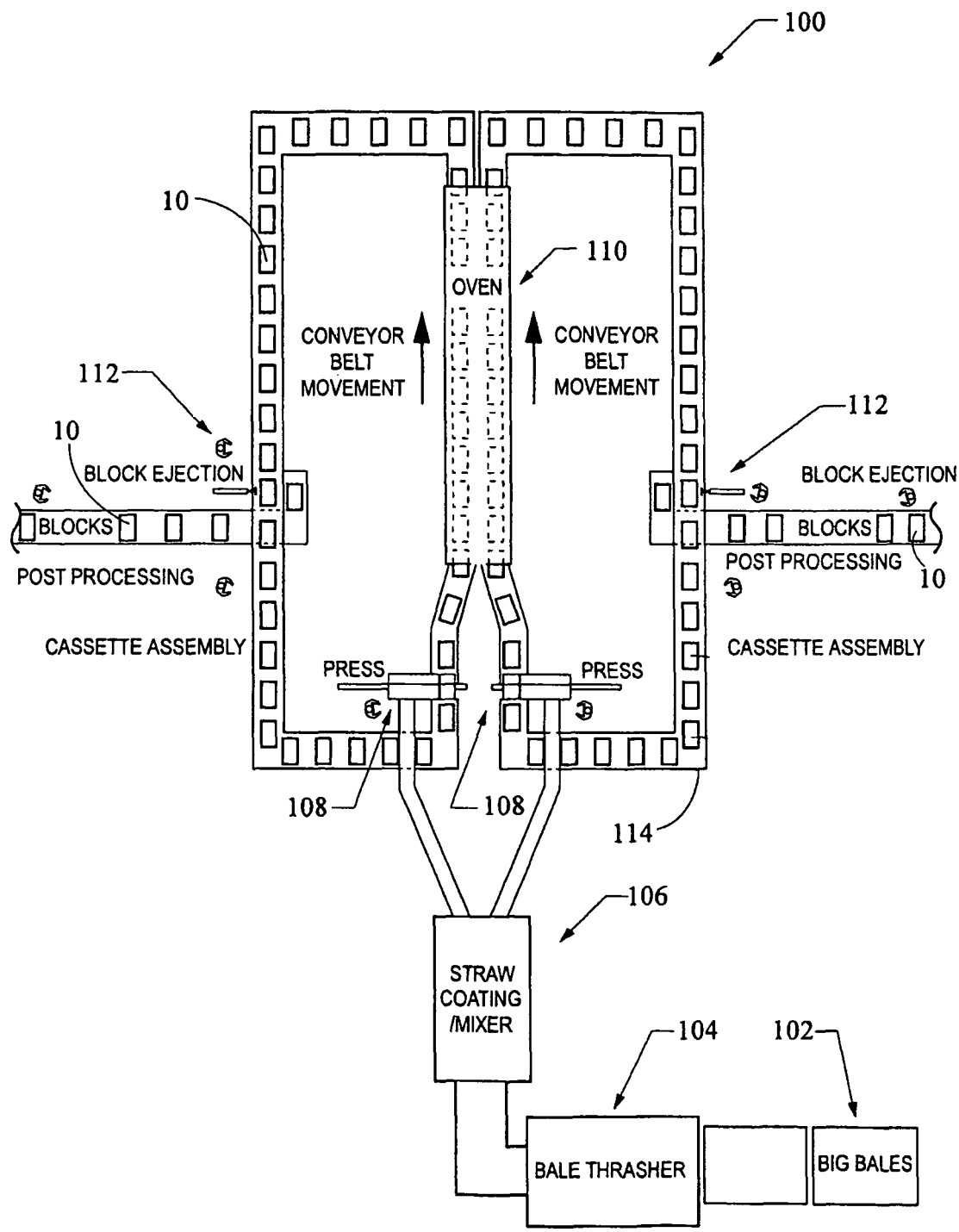
FIG. 6 illustrates a schematic of manufacturing process for producing multiple building blocks.

In a second example (useful as well for agricultural by-products other than straw stalks), a factory assembly plant, an example of which is shown in FIG. 6, may be utilized to form the blocks of the present invention. The assembly plant may include one or more conveyor systems 100. The system includes a straw bale receiving station 102 for receiving and/or storing bales of straw stalks. The receiving station may be configured to receive bales of straw in the quantity of about 80 to 100 lb bales up to 800 to 1000 lb bales. Accordingly, it is contemplated that the receiving station or otherwise may include bulk storage containers. The straw stalks may then be moved to a thrasher station 104 where the straw stalks are prepared (e.g. cleaned, separated, dried, cut or otherwise). The straw stalks may then be moved to a binding station 106 where agents are added to the straw stalks (e.g. binder or otherwise) through a tumbler or mixer as described herein to evenly distribute and/or otherwise coat the straw stalks with a binder and/or other agent.

The straw stalks may then be moved to a forming station 108 where the straw is inserted and compressed using a mold assembly, such as the mold assembly described herein or otherwise. Optionally, the forming station, or otherwise, may include a vertical hopper configured to weigh and insert a specified weight and/or volume of straw stalks into the mold assembly. The second wall portion may then be placed over the opening formed by the mold assembly. A compressor may then apply force, as described herein, to compress the straw stalks. After compression, the first wall portion is then locked into place through the locking device described herein or otherwise.

The compressed stalks and mold assembly are then moved to a heating station comprising a conveyor oven 110. Through the conveying system the blocks are heated, as described herein, at a predetermined temperature and time. Upon completion of heating, the blocks are cooled (through a fan or otherwise) and are moved to an inspection station 112 where the blocks are inspected. The blocks are then further moved for further processing and/or shipping, which may include palletizing of the formed blocks. It should be appreciated that the assembly plant may be largely automated. Further, the assembly plant may include a conveyor 114 for moving the straw stalks and blocks through the various stations.

Other features or stations that may be included before, after, with or in between any of the forgoing station or steps, of either the first or second examples, include the following.

The assembly plant may include a straw conditioner to generate uniformed sized straw. This may include cutting, chopping, splitting, or shredding devices. For example, the straw conditioner may comprise a stacking or un-stacking device, hopper and shredder which may be moved about by hand or machine (e.g. fork lift).

A drier may also be used to modify or achieve a desired moisture content of the straw stalks. In one configuration the drier comprises a heated or non-heated air source configured to move air across the straw stalks. Optionally, the moisture content of the straw stalks may be tested with a suitable device.

A sorter may be used to remove any unwanted foreign or non-foreign items from the straw stalks. In one configuration the sorter comprises or includes a shaker. Upon completion of sorting, the straw stalks may be forwarded to the binding station or moved to an additional storage station.

It should be appreciated that the features and methods of the mobile station and the factory assembly plant may be interchanged between each other or otherwise used to form yet additional configurations.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. Similarly, specific features or components described in the different embodiments of the blocks may be used with other embodiments or may be combined with yet other features or components to form other embodiments. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A building block, comprising:
a plurality of opposing spaced apart outer walls, each outer wall having an outer wall portion exhibiting a first density that surrounds an interior portion having a second density that is less than the first density;
a plurality of stalks of agricultural by-products that are bonded together with an added binder that includes an isocyanate, a reaction product involving a reaction with an isocyanate, or both in addition to any naturally occurring binder of the stalks;
wherein the plurality of stalks are randomly oriented, and have an average length of greater than about 3 cm;
wherein the ratio by weight of the stalks to the added binder is greater than about 10:1,
wherein a progressive density gradient exists from the outer wall portion toward the interior portion.

2. The block of claim 1, wherein the difference in density between the first density and the second density is at least about 10%, and all of the outer walls have substantially the same density.

3. The block of claim 2, wherein the outer walls of the block have a Janka hardness of at least about 45 kgf.

4. The block of claim 3, wherein the openings are free of concrete, plaster, reinforcing bars, gravel, or other material for increasing the structural integrity of the walls.

5. The block of claim 2, wherein the block includes at least two openings, and the openings are configured so that the openings align with an adjoining block when the blocks are stacked in a staggered relationship.

6. The block of claim 1, wherein the block includes a top wall, a bottom wall spaced from the top wall, a pair of opposing spaced apart side walls, a front wall and a rear wall spaced apart from the front wall;
wherein the side walls are flat and are orthogonally connected to the front wall and the rear wall; and
one or more openings that extend between the top wall and the bottom wall providing a passage between such walls.

7. The block of claim 6, wherein one of the top wall or the bottom wall includes a structure that generally surrounds the one or more openings and project outwardly away from such wall, and the other of the top wall or bottom wall includes a recessed structure that generally surrounds the one or more openings and project inwardly from such wall, so that when the block is assembled with an adjoining block the projecting structure matingly engages the recessed structure.

8. The block of claim 1, wherein the one or more openings that extend between the top wall and the bottom wall are generally tapered.

9. The block of claim 8, wherein the one or more openings that extend between the top wall and the bottom wall are generally hour glass shaped.

10. The block of claim 1, wherein at least one of the walls includes a rib projection that extends across the wall, and another of the walls includes a channel that extends across the wall, so that when a block is assembled with an adjoining block the rib matingly engages the channel.

11. The block of claim 1, wherein the block exhibits a compressive yield strength of 16 to about 35 psi measured using ASTM C-109.

12. The block of claim 1, wherein the block is free of any encircling band or sleeve.

13. The block of claim 1, wherein the block is machined so that the size and shape of the block may be changed and the block is machined so that the block includes one or more holes for electrical wires, pipes, or other building materials to extend at least partially there through.

14. A building block, comprising:
a plurality of opposing spaced apart outer walls, each outer wall having an outer wall portion exhibiting a first density that surrounds an interior portion having a second density that is less than the first density;
a plurality of stalks of agricultural by-products that are bonded together with a synthetically made resin binder in addition to any naturally occurring binder of the stalks;
wherein the plurality of stalks are randomly oriented, and have an average length of greater than about 3 cm;
wherein the ratio by weight of the stalks to the added binder is greater than about 10:1,
wherein a progressive density gradient exists from the outer wall portion toward the interior portion.

15. The block of claim 14, wherein the synthetically made resin binder is generally non-polar.

16. The block of claim 14, wherein the synthetically made resin binder includes one or more aromatic moiety.

17. The block of claim 14, wherein the synthetically made resin binder includes an isocyanate, a reaction product involving an isocyanate reactant, or both.

18. A building block, comprising:
a plurality of opposing spaced apart outer walls, each outer wall having an outer wall portion exhibiting a first density that surrounds an interior portion having a second density that is less than the first density;
a plurality of stalks of agricultural by-products that are bonded together with a synthetically made resin binder in addition to any naturally occurring binder of the stalks;
wherein the plurality of stalks are randomly oriented, and have an average length of greater than about 6 cm;
wherein the ratio by weight of the stalks to the added binder is greater than about 10:1,
wherein a progressive density gradient exists from the outer wall portion toward the interior portion.

19. The building block of claim 18, wherein at least 75 percent by weight of the stalks used have a length between about 3 cm and about 40 cm.

* * * * *